US012228867B2

(12) United States Patent
Wang et al.

(10) Patent No.: US 12,228,867 B2
(45) Date of Patent: Feb. 18, 2025

(54) TONER CARTRIDGE INCLUDING CONVEYER MEMBER ROTATABLE ABOUT AXIS INSIDE CASING AND SHUTTER ROTATABLE ABOUT THE AXIS FROM CLOSED POSITION TO OPEN POSITION

(71) Applicant: BROTHER KOGYO KABUSHIKI KAISHA, Nagoya (JP)

(72) Inventors: Yuwen Wang, Nagoya (JP); Junichi Hashimoto, Toyohashi (JP); Takuya Amaike, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/323,558

(22) Filed: May 25, 2023

(65) Prior Publication Data

US 2023/0297006 A1 Sep. 21, 2023

Related U.S. Application Data

(63) Continuation of application No. PCT/JP2021/043644, filed on Nov. 29, 2021.

(30) Foreign Application Priority Data

Nov. 30, 2020 (JP) ................................ 2020-198511

(51) Int. Cl.
*G03G 15/08* (2006.01)
*G03G 21/16* (2006.01)

(52) U.S. Cl.
CPC ..... *G03G 15/0886* (2013.01); *G03G 21/1647* (2013.01); *G03G 21/1676* (2013.01)

(58) Field of Classification Search
CPC ........... G03G 15/0872; G03G 15/0886; G03G 21/1647; G03G 21/1676
See application file for complete search history.

(56) References Cited

U.S. PATENT DOCUMENTS

2007/0048027 A1 3/2007 Park
2007/0280743 A1 12/2007 Nakajima et al.
(Continued)

FOREIGN PATENT DOCUMENTS

EP 1818729 A1 * 8/2007 ............ G03G 15/00
JP 1-108581 A 4/1989
(Continued)

OTHER PUBLICATIONS

International Search Report and Written Opinion issued in related PCT/JP2021/043644, mailed Jan. 23, 2022.
(Continued)

*Primary Examiner* — Sophia S Chen
(74) *Attorney, Agent, or Firm* — Merchant & Gould P.C.

(57) ABSTRACT

A toner cartridge includes: a casing; a conveyer member rotatable about an axis; a shutter rotatable about the axis between a closed position and an open position; a toner coupling rotatable about the axis; a planet carrier rotatable about the axis with the toner coupling; a planetary gear rotatable about a pin of the planet carrier and rotatable about the axis in accordance with the rotation of the planet carrier; and a ring gear meshing with the planetary gear and rotatable about the axis with the shutter. When the shutter moves from the closed position to the open position, the planetary gear is not rotatable about the pin and is rotatable about the axis with the ring gear. In a state where the shutter is at the open position, the planetary gear is rotatable about the pin and is rotatable about the axis relative to the ring gear.

44 Claims, 17 Drawing Sheets

(56) References Cited

U.S. PATENT DOCUMENTS

| | | | |
|---|---|---|---|
| 2011/0217068 | A1 | 9/2011 | Kamimura et al. |
| 2020/0301345 | A1 | 9/2020 | Suzuki |

FOREIGN PATENT DOCUMENTS

| | | | |
|---|---|---|---|
| JP | 2006-178438 | A | 7/2006 |
| JP | 2011-186067 | A | 9/2011 |

OTHER PUBLICATIONS

Extended European Search Report issued in corresponding European application No. 21898155.3, Sep. 11, 2024.
Office Action issued in corresponding Canadian Patent Application 3,200,607, Sep. 26, 2024.
Office Action issued in corresponding Japanese Patent Application No. 2020-198511, Dec. 24, 2024.

* cited by examiner

TONER CARTRIDGE INCLUDING CONVEYER MEMBER ROTATABLE ABOUT AXIS INSIDE CASING AND SHUTTER ROTATABLE ABOUT THE AXIS FROM CLOSED POSITION TO OPEN POSITION

REFERENCE TO RELATED APPLICATIONS

This is a by-pass continuation application of International Application No. PCT/JP2021/043644 filed on Nov. 29, 2021 claiming priority from Japanese Patent Application No. 2020-198511 filed on Nov. 30, 2020. The entire contents of the International Application and the priority application are incorporated herein by reference.

BACKGROUND ART

Conventionally, there has been known an electro-photographic type image-forming apparatus such as a laser printer and an LED printer. The image-forming apparatus includes a toner cartridge, and a drum cartridge. The toner cartridge is attachable to the drum cartridge. The drum cartridge, to which the toner cartridge has been attached, is attachable to a main body of the image-forming apparatus. A prior art discloses one of such conventional image-forming apparatuses.

DESCRIPTION

A toner cartridge includes a shutter for opening and closing a toner supply opening. In the image-forming apparatus according to the prior art, the shutter moves from its closed position to its open position by user's operations, after the toner cartridge is attached to the drum cartridge. In an attempt to reduce user's labor, preferably, the shutter moves from the closed position to the open position by a driving force supplied from the main body of the image-forming apparatus. Here, a plurality of couplings may be required if the driving force for rotating a conveyer member to convey toner in the toner cartridge and the driving force for moving the shutter from the closed position to the open position are to be separately supplied.

In view of the foregoing, it is an object of the present disclosure to provide a structure capable of realizing rotations of the conveyer member as well as movements of the shutter from the closed position to the open position by the driving force supplied from a coupling, and further capable of maintaining the rotations of the conveyer member after the movement of the shutter to the open position from the closed position.

In order to attain the above and other objects, according to one aspect, the disclosure provides a toner cartridge including a casing, a conveyer member, a shutter, a toner coupling, a planet carrier, a first planetary gear, and a ring gear. The casing is configured to accommodate therein toner and has a toner discharge opening. The conveyer member is positioned inside the casing and rotatable about a first axis extending in a first direction. The conveyer member includes a shaft extending in the first direction. The shutter is rotatable relative to the casing about the first axis between a closed position where the shutter closes the toner discharge opening and an open position where the shutter opens the toner discharge opening. The toner coupling is rotatable about the first axis and is configured to rotate the conveyer member. The planet carrier is rotatable about the first axis with the toner coupling. The planet carrier includes a first planet pin extending in the first direction. The first planetary gear is rotatable about the first planet pin relative to the planet carrier. The first planetary gear is rotatable about the first axis in accordance with the rotation of the planet carrier about the first axis. The ring gear is rotatable about the first axis with the shutter. The ring gear meshes with the first planetary gear. The first planetary gear is not rotatable about the first planet pin, and is rotatable about the first axis with the ring gear when the shutter moves from the closed position to the open position. The first planetary gear is rotatable about the first planet pin and is rotatable relative to the ring gear about the first axis in a state where the shutter is at the open position.

According to the above aspect of the present disclosure, the driving force supplied from a coupling can realize rotations of the conveyer member as well as movements of the shutter from the closed position to the open position. Further, the conveyer member can continue to rotate after the shutter moves to the open position from the closed position.

Hereinafter, a toner cartridge 2 according to one embodiment of the present disclosure will be described while referring to the accompanying drawings.

In the following description, an extending direction of an agitator 20 (FIG. 3) of the toner cartridge 2 will be referred to as a "first direction". Further, in a drum cartridge 3, a direction of an array of a plurality of photosensitive drums 70 (FIG. 1) will be referred to as a "second direction". Further, an insertion direction of the toner cartridge 2 to the drum cartridge 3 will be referred to as a "third direction". The first direction and the second direction cross each other, and preferably, perpendicular to each other. The second direction and the third direction cross each other, and preferably, perpendicular to each other. The third direction and the first direction cross each other, and preferably, perpendicular to each other.

1. Structure of Image-Forming Apparatus

Figure 1:
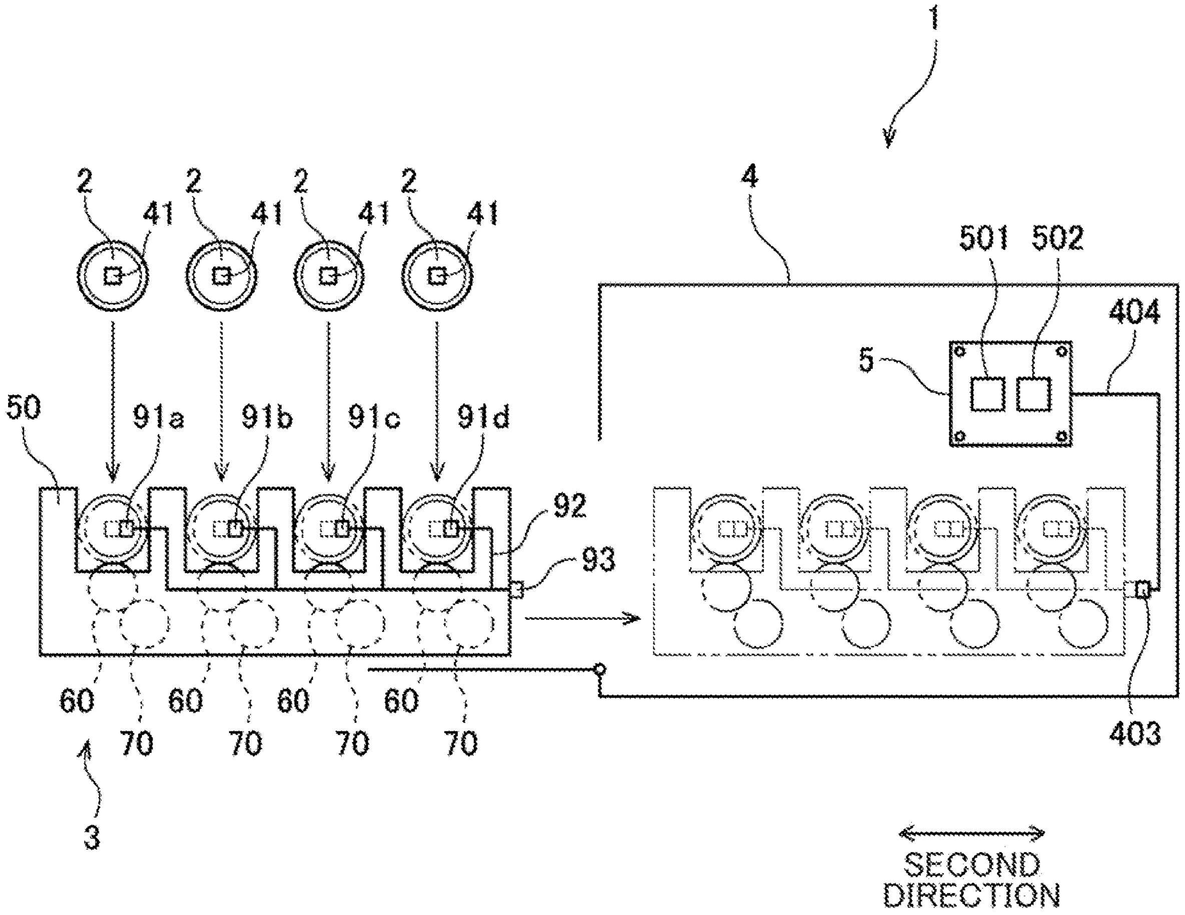
FIG. 1 is a schematic view of an image-forming apparatus.

FIG. 1 is a schematic view of an image-forming apparatus 1. The image-forming apparatus 1 is an electro-photographic type printer. Specifically, the image-forming apparatus 1 is a laser printer or an LED printer. As illustrated in FIG. 1, the image-forming apparatus 1 includes four toner cartridges 2, the drum cartridge 3, a body frame 4, and a controller 5.

As illustrated in FIG. 1, the four toner cartridges 2 are attachable to and detachable from the drum cartridge 3. Further, the drum cartridge 3 (to which the four toner cartridges 2 are attached) is a drawer attachable to and detachable from the body frame 4. The number of the toner cartridge 2 attachable to the drum cartridge 3 is four in the present embodiment. However, the number of the toner cartridge 2 may be from one to three or not less than five.

The four toner cartridges 2 respectively accommodate therein toner of different colors (for example, cyan, magenta, yellow, and black). The image-forming apparatus 1 is configured to form an image on a printing sheet by the toner supplied from the four toner cartridges 2.

The controller 5 is positioned in the body frame 4 of the image-forming apparatus 1. The controller 5 includes a processor 501 such as a CPU, and a built-in memory 502. The built-in memory 502 is a storage medium from which information is readable and in which information is writable. The processor 501 is configured to read the information from the built-in memory 502 and write information in the built-in memory 502. The controller 5 is configured to realize printing in the image-forming apparatus 1 through the operations of the processor 501 in accordance with the programs stored in the built-in memory 502.

Each of the four toner cartridges 2 has an IC chip 41. The IC chip 41 is a readable/writable storage medium. The drum cartridge 3 includes: four drum contacts 91*a*, 91*b*, 91*c* and 91*d*; a drum harness 92; and a drum connector 93. The four drum contacts 91*a*-91*d* are electrically connected to the drum connector 93 through the drum harness 92. Further, the image-forming apparatus 1 includes a built-in connector 403 and a built-in harness 404 those positioned inside the body frame 4. The built-in connector 403 is electrically connected to the controller 5 through the built-in harness 404.

Upon attachment of the toner cartridges 2 to the drum cartridge 3, the IC chips 41 contact the drum contacts 91*a*, 91*b*, 91*c* and 91*d*, respectively. Hence, the IC chips 41 are electrically connected to the drum contacts 91*a*-91*d*. Further, upon attachment of the drum cartridge 3 (to which the toner cartridges 2 are attached) to the body frame 4, the drum connector 93 contacts the built-in connector 403 so that the drum connector 93 is electrically connected to the built-in connector 403. Accordingly, the IC chips 41 are electrically connected to the controller 5 through the drum contacts 91*a*-91*d*, the drum harness 92, the drum connector 93, the built-in connector 403, and the built-in harness 404. As a result, the controller 5 can read information from the IC chips 41 and write information in the IC chips 41.

Figure 2:
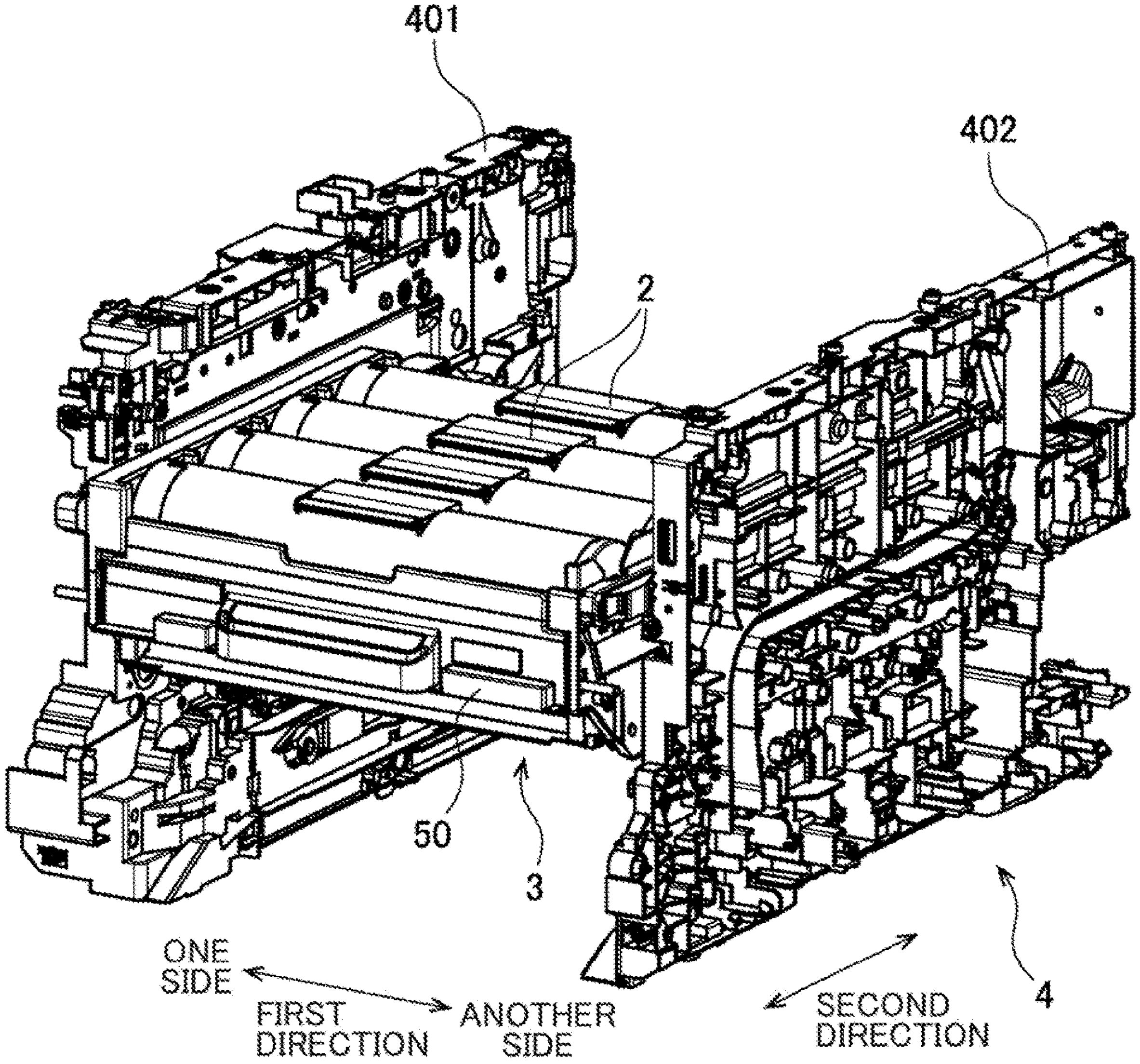
FIG. 2 is a perspective view of four toner cartridges each according to one embodiment of the disclosure, a drum cartridge, and a part of a body frame.

FIG. 2 is a perspective view of the four toner cartridges 2, the drum cartridge 3, and a part of the body frame 4. As illustrated in FIG. 2, the body frame 4 includes a first side plate 401 and a second side plate 402. The first side plate 401 and the second side plate 402 have a generally flat plate shape extending perpendicularly to the first direction. The first side plate 401 and the second side plate 402 are spaced away from each other in the first direction. The drum cartridge 3 to which four toner cartridges 2 are attached can be inserted in the second direction into a space between the first side plate 401 and the second side plate 402.

2. Toner Cartridge

A structure of the toner cartridge 2 will be described next.

Figure 3:
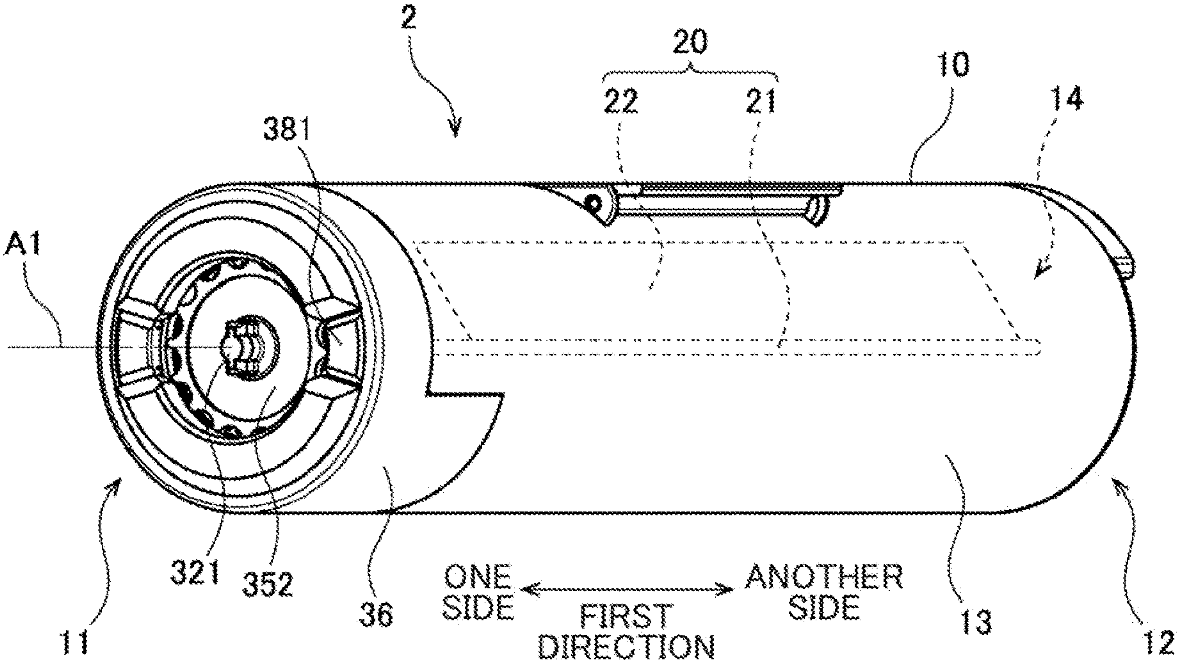
FIG. 3 is a perspective view of the toner cartridge according to the embodiment.
Figure 4:
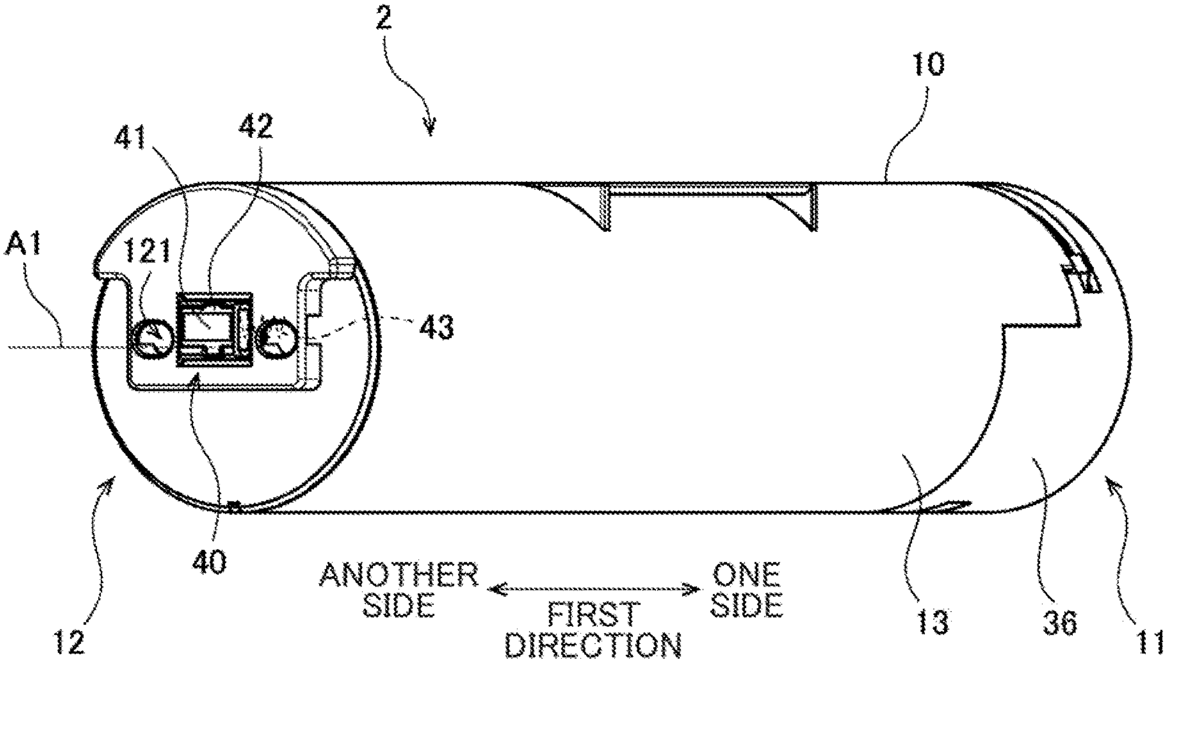
FIG. 4 is another perspective view of the toner cartridge according to the embodiment.
Figure 5:
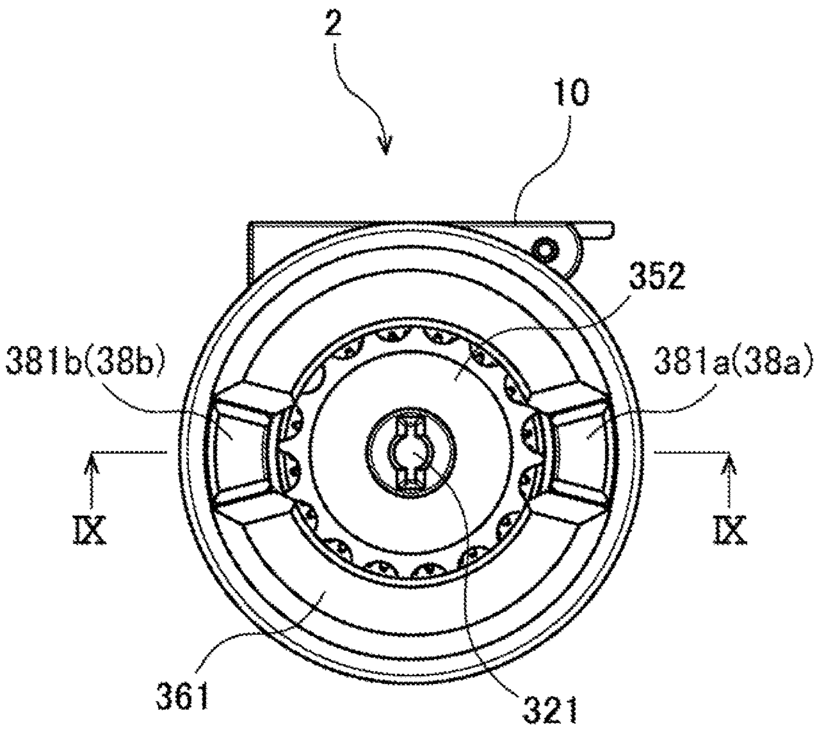
FIG. 5 is a view of the toner cartridge according to the embodiment as viewed from one side thereof in a first direction.
Figure 6:
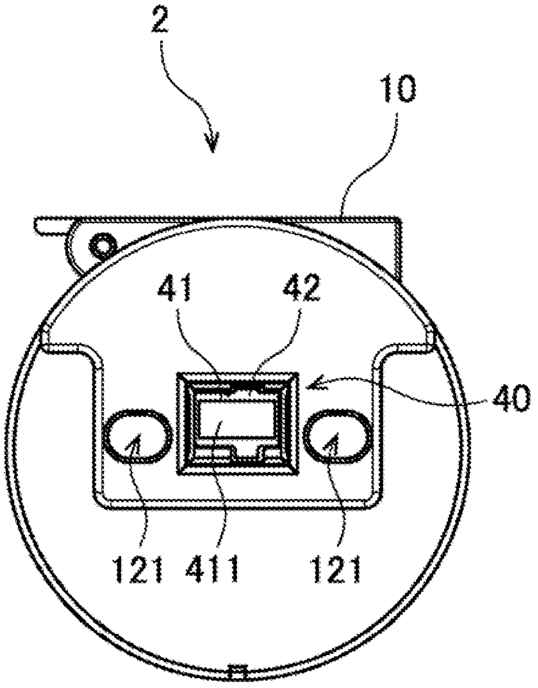
FIG. 6 is a view of the toner cartridge according to the embodiment as viewed from another side thereof in the first direction.
Figure 7:
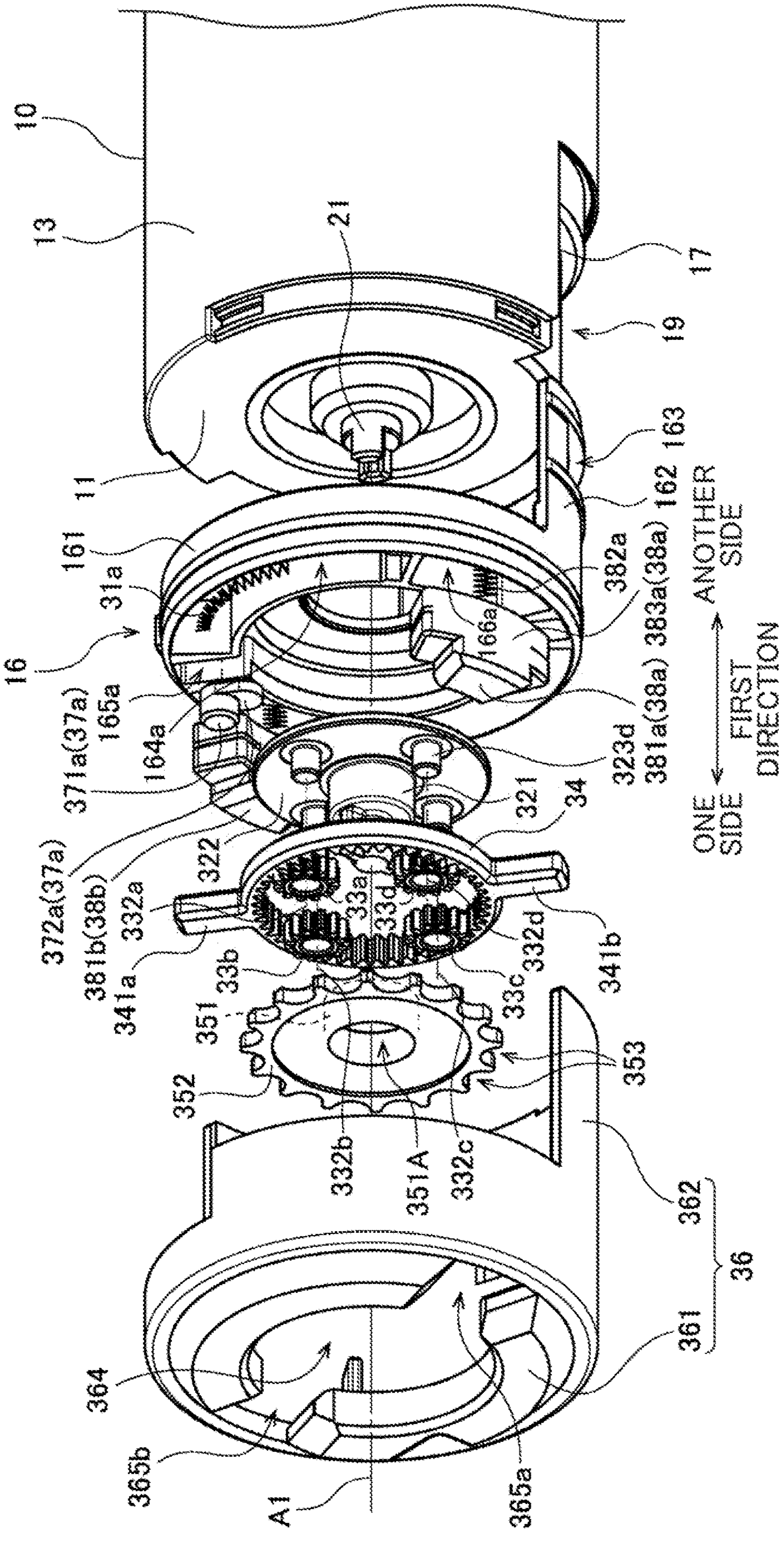
FIG. 7 is a partial exploded perspective view illustrating components at a first end portion of a casing of the toner cartridge according to the embodiment.
Figure 8:
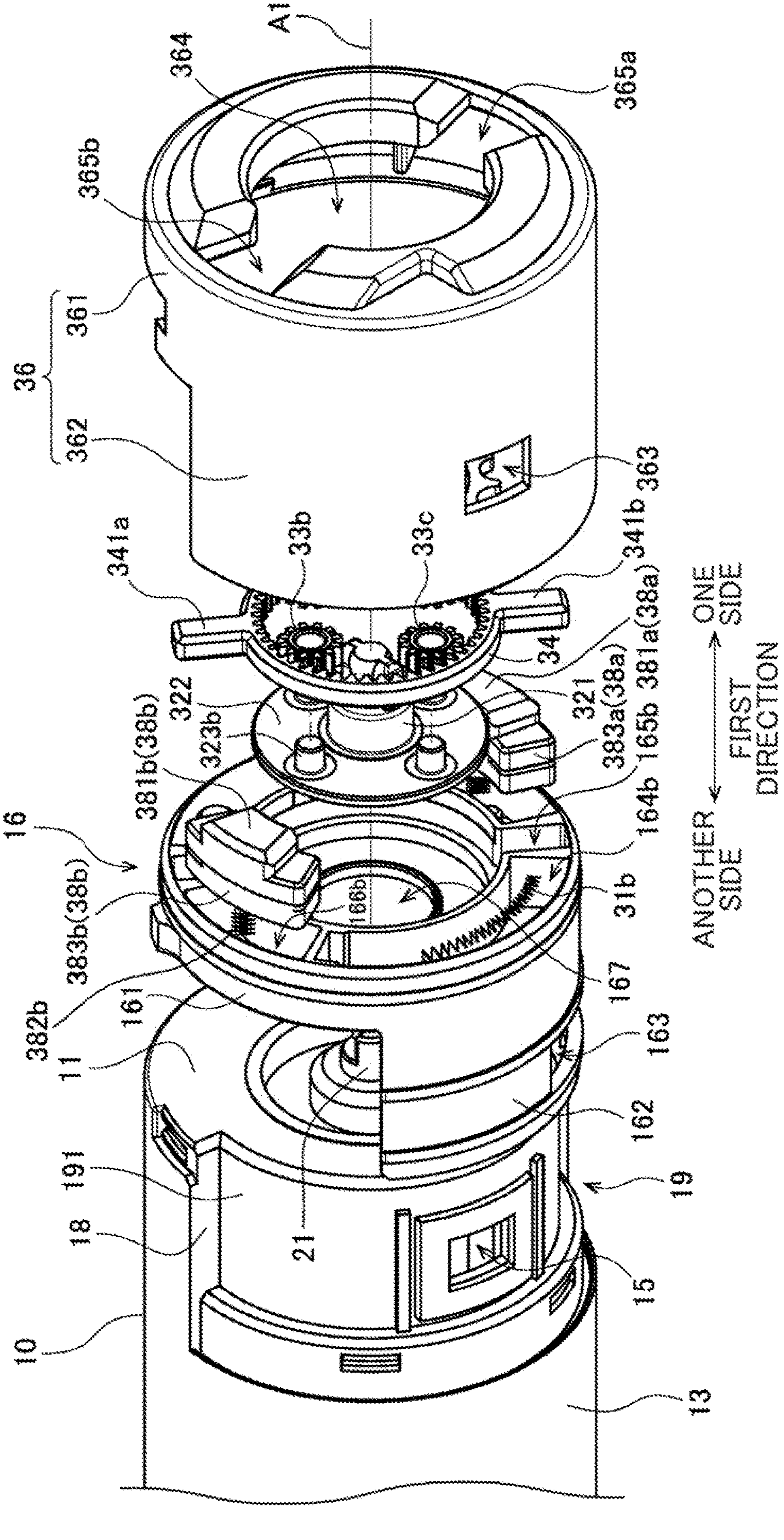
FIG. 8 is another partial exploded perspective view illustrating the components at the first end portion of the casing of the toner cartridge according to the embodiment.
Figure 9:
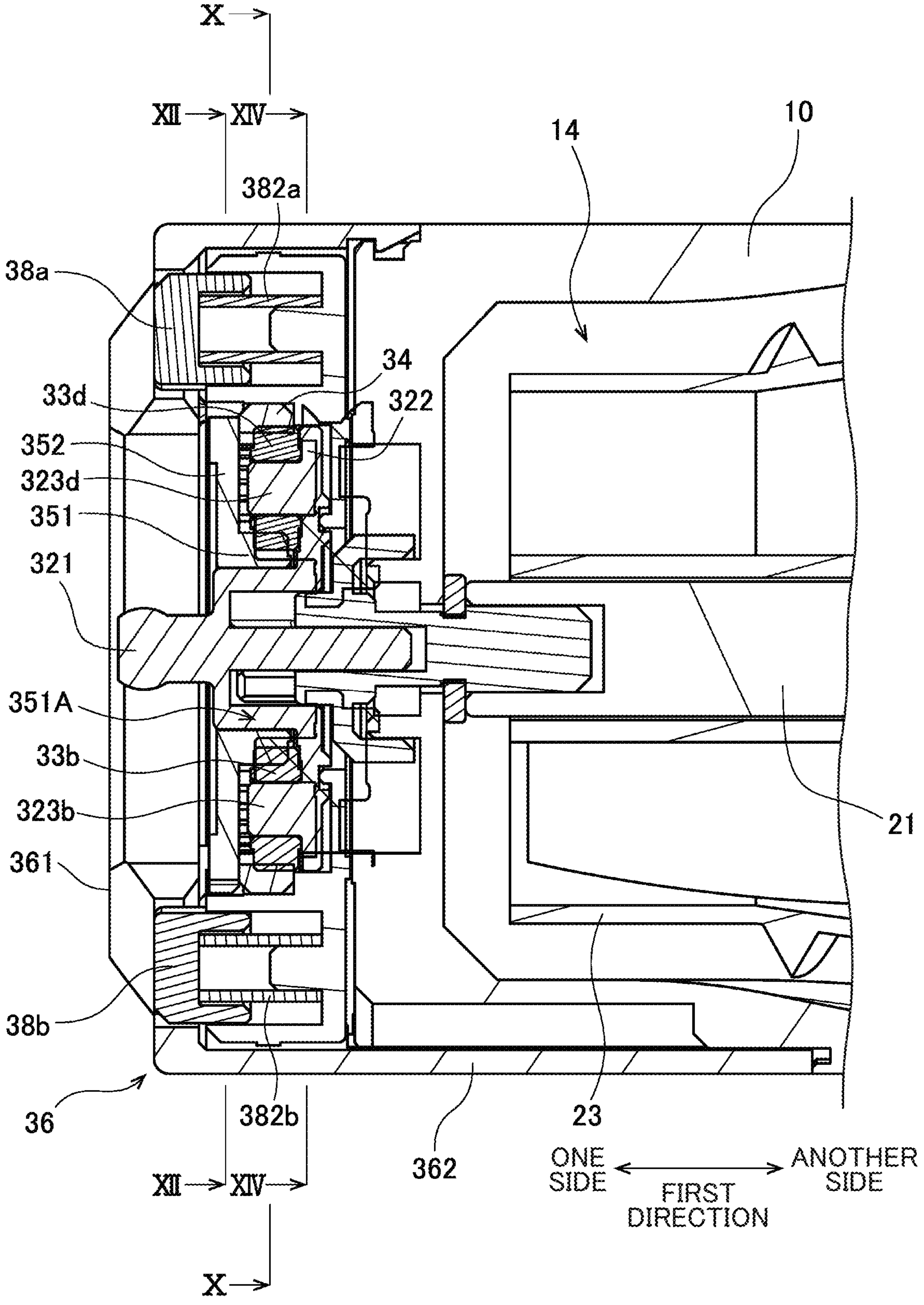
FIG. 9 is a cross-sectional view of the toner cartridge according to the embodiment taken along a line IX-IX in FIG. 5.

FIGS. 3 and 4 are perspective views of the toner cartridge 2. FIG. 5 is a view of the toner cartridge 2 as viewed in a first direction from the side of a first end portion 11 described later. FIG. 6 is a view illustrating the toner cartridge 2 as viewed in the first direction from the side of a second end portion 12 described later. FIGS. 7 and 8 are partial exploded perspective views of the toner cartridge 2. FIG. 9 is a cross-sectional view of the toner cartridge 2 taken along the line IX-IX in FIG. 5.

As illustrated in FIGS. 3 through 9, the toner cartridge 2 includes a casing 10, a shutter 16, the agitator 20, two return springs 31*a*, 31*b*, a toner coupling 321, a planet carrier 322, a first planetary gear 33*a*, a second planetary gear 33*b*, a third planetary gear 33*c*, a fourth planetary gear 33*d*, a ring gear 34, a sun gear 351, a rotary plate 352, a cover 36, two bosses 37*a*, 37*b* (FIG. 10), two locking members 38*a*, 38*b*, and an IC chip assembly 40.

The casing 10 is a container for accommodating therein toner as developing agent. The casing 10 extends in the first direction. The casing 10 has the first end portion 11, the second end portion 12 and a sleeve-like peripheral surface 13. The first end portion 11 is distant from the second end portion 12 in the first direction. The shutter 16, the two return springs 31*a*, 31*b*, the toner coupling 321, the planet carrier 322, the first planetary gear 33*a*, the second planetary gear 33*b*, the third planetary gear 33*c*, the fourth planetary gear 33*d*, the ring gear 34, the sun gear 351, the rotary plate 352, the cover 36, the two bosses 37*a*, 37*b*, and the two locking members 38*a*, 38*b* are positioned at the first end portion 11. The IC chip assembly 40 is positioned at the second end portion 12. The peripheral surface 13 extends in the first direction to connect the first end portion 11 and the second end portion 12. The peripheral surface 13 is cylindrical in shape whose center is defined by a first axis A1 extending in the first direction.

The casing 10 defines therein an accommodation chamber 14. Toner is accommodated in the accommodation chamber 14. The casing 10 has a toner discharge opening 15, as illustrated in FIG. 8. The toner discharge opening 15 is positioned at one end portion in the first direction of the peripheral surface 13.

The shutter 16 is positioned at the first end portion 11 of the casing 10. The shutter 16 includes a holder 161 and a shutter plate 162. The holder 161 has a generally disc like shape whose center is coincident with the first axis A1. The shutter plate 162 extends from a part of the holder 161 in the first direction toward to the second end portion 12 of the casing 10. The shutter plate 162 has a shutter opening 163.

The shutter 16 is rotatable relative to the casing 10 about the first axis A1 between a closed position where the shutter 16 closes the toner discharge opening 15 and an open position where the shutter 16 opens the toner discharge opening 15. The shutter plate 162 covers the toner discharge opening 15 when the shutter 16 is at the closed position. Hence, the shutter 16 closes the toner discharge opening 15. The shutter opening 163 of the shutter plate 162 overlaps with the toner discharge opening 15 when the shutter 16 is at the open position. Hence, the shutter 16 opens the toner discharge opening 15. That is, the accommodation chamber 14 is made in communication with an outside of the casing 10 through the toner discharge opening 15, the shutter opening 163 and a communication opening 363 of the cover 36 (described later). As a result, the toner accommodated in the accommodation chamber 14 is allowed to move to the drum cartridge 3.

The peripheral surface 13 of the casing 10 has a recess 19. The shutter plate 162 of the shutter 16 is positioned in the recess 19. The recess 19 has a first surface 191, a first stopper surface 18, and a second stopper surface 17. The first surface 191 has the toner discharge opening 15. The first stopper surface 18 extends outward from the first surface 191 in a radial direction of an agitator shaft 21 (described later) of the agitator 20. The second stopper surface 17 also extends radially outwardly from the first surface 191.

The first stopper surface 18 is configured to stop a rotational movement of the shutter 16 from the closed position to the open position. The shutter 16 (shutter plate 162) is in contact with the first stopper surface 18 at the open position of the shutter 16. The second stopper surface 17 is configured to stop a rotational movement of the shutter 16 from the open position to the closed position. The shutter 16 (shutter plate 162) is in contact with the second stopper surface 17 at the closed position of the shutter 16. Hence, the rotational movement of the shutter 16 is restricted to a range between the closed position and the open position.

Incidentally, the first stopper surface 18 may not be configured to completely stop the rotational movement of the shutter 16. For example, the shutter 16 may be slightly movable in a state of contact with the first stopper surface 18. Further, the second stopper surface 17 may not be configured to completely stop the rotational movement of the shutter 16. For example, the shutter 16 may be slightly movable in a state of contact with the second stopper surface 17.

In the present embodiment, the toner discharge opening 15 and the first stopper surface 18 are both provided in the casing 10. Therefore, precise positioning of the shutter 16 relative to the toner discharge opening 15 can be realized. Further, in the present embodiment, the toner discharge opening 15 and the second stopper surface 17 are both provided in the casing 10. Therefore, precise positioning of the shutter 16 relative to the toner discharge opening 15 can be realized. Alternatively, the cover 36 may have the first stopper surface 18 and the second stopper surface 17. Still alternatively, the first stopper surface 18 and the second stopper surface 17 may not be integral with the case 10 or the cover 36.

The holder 161 has a circular hole 167. The hole 167 penetrates through a center portion of the holder 161 in the first direction. The toner coupling 321, the planet carrier 322, the ring gear 34, the sun gear 351, and the rotary plate 352 are positioned in the hole 167.

Figure 10:
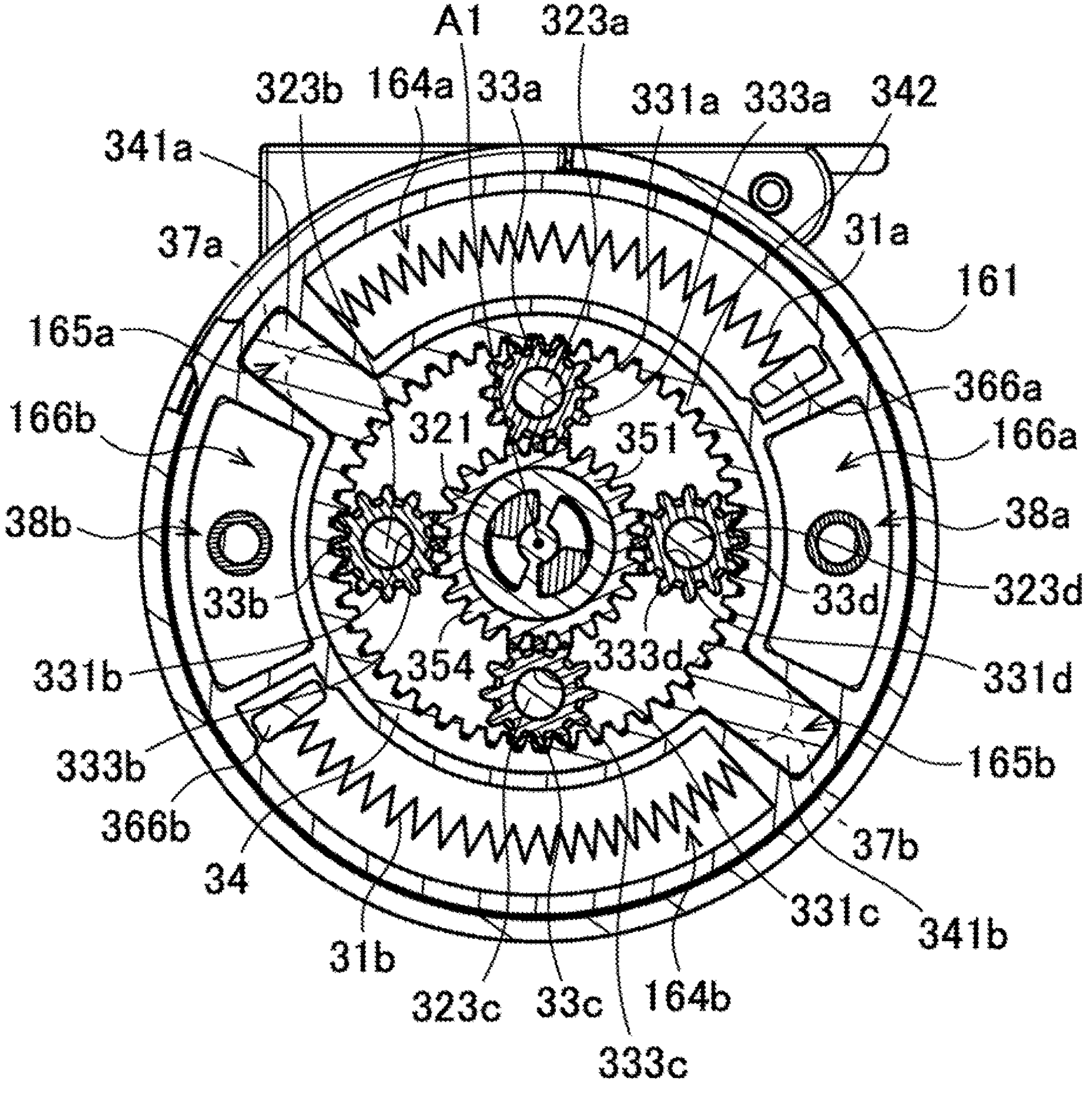
FIG. 10 is a cross-sectional view of the toner cartridge according to the embodiment taken along a line X-X in FIG. 9.

FIG. 10 is a cross-sectional view taken along the line X-X in FIG. 9. As illustrated in FIG. 10, the holder 161 has a first recess 164*a*, a second recess 165*a*, a third recess 166*a*, a fourth recess 164*b*, a fifth recess 165*b*, and a sixth recess 166*b*. These recesses 164*a*, 165*a*, 166*a*, 164*b*, 165*b*, 166*b* are recessed in the first direction toward the second end portion 12 of the casing 10. These recesses 164*a*, 165*a*, 166*b*, 164*b*, 165*b*, 166*a* are arrayed with one another in this order in a circumferential direction to surround the hole 167.

The agitator 20 is a conveyer member configured to agitate and convey the toner inside the casing 10. The agitator 20 is positioned inside the casing 10. As illustrated by broken lines in FIG. 3, the agitator 20 includes the agitator shaft 21 and an agitator fin 22. The agitator shaft 21 extends in the first direction along the first axis A1. The agitator shaft 21 has one end portion and another end portion in the first direction. The one end portion of the agitator shaft 21 is positioned at the first end portion 11 of the casing 10. The other end portion of the agitator shaft 21 is positioned at the second end portion 12 of the casing 10.

The agitator fin 22 extends radially outwardly from the agitator shaft 21. That is, the agitator fin 22 extends from the agitator shaft 21 toward an inner peripheral surface of the casing 10. The toner coupling 321 is connected to the one end portion of the agitator shaft 21. In accordance with rotations of the toner coupling 321 about the first axis A1, the agitator shaft 21 and the agitator fin 22 also rotate about the first axis A1 together with the toner coupling 321. The toner in the casing 10 is agitated by the rotations of the agitator fin 22.

Further, as illustrated in FIG. 9, the agitator 20 includes a sleeve member 23. The sleeve member 23 is fixed to the agitator shaft 21. The sleeve member 23 is positioned closer to the one end portion of the agitator shaft 21 than to the other end portion of the agitator shaft 21 in the first direction. The sleeve member 23 has an outer peripheral surface formed with a helical groove.

The two return springs 31*a*, 31*b*, the toner coupling 321, the planet carrier 322, the first planetary gear 33*a*, the second planetary gear 33*b*, the third planetary gear 33*c*, the fourth planetary gear 33*d*, the ring gear 34, the sun gear 351, the rotary plate 352, the cover 36, the two bosses 37*a*, 37*b*, and the two locking members 38*a*, 38*b* are constituents of a mechanism for operating the shutter 16 and the agitator 20. These components are positioned at the first end portion 11 of the casing 10.

The two return springs 31*a* and 31*b* are elastic members to urge the shutter 16 from the open position toward the closed position. The two return springs 31*a* and 31*b* are tension springs. The return spring 31*a* is accommodated in the first recess 164*a* formed in the holder 161. The return spring 31*b* is accommodated in the fourth recess 164*b* formed in the holder 161.

The first recess 164*a* is arcuate in shape whose center axis is coincident with the first axis A1. The return spring 31*a* has one end and another end in the circumferential direction about the first axis A1. The one end of the return spring 31*a* is connected to the holder 161. The other end of the return spring 31*a* is connected to a spring seat 366*a* (described later) of the cover 36. The return spring 31*b* has one end and another end in the circumferential direction about the first axis A1. The one end of the return spring 31*b* is connected to the holder 161. The other end of the return spring 31*a* is connected to a spring seat 366*b* (described later) of the cover 36. With this structure, lengths of the return springs 31*a* and 31*b* in the rotational direction of the shutter 16 can change in accordance with the movement of the shutter 16 between the closed position and the open position.

Specifically, the lengths of the return springs 31*a*, 31 *b* in the rotational direction of the shutter 16 is changeable between a first state and a second state. The return springs 31*a* and 31*b* are at the first state while the shutter 16 is at the closed position, whereas the return springs 31*a* and 31*b* are at the second state while the shutter 16 is at the open position. The lengths of the return springs 31*a*, 31 *b* in the rotational direction of the shutter 16 is greater in the second state than in the first state. Further, the lengths of the return springs 31*a*, 31 *b* in the rotational direction of the shutter 16 in the second state are greater than natural lengths of the return springs 31*a*, 31 *b* in the rotational direction of the shutter 16.

The toner coupling 321 is connectable to a relay coupling 82 (described later) of the drum cartridge 3. The toner coupling 321 is configured to receive driving force from the relay coupling 82 in a state where the toner coupling 321 is connected to the relay coupling 82. The toner coupling 321 is rotatable about the first axis A1 upon receipt of the driving force from the relay coupling 82. The toner coupling 321 is connected to the one end portion in the first direction of the agitator shaft 21. Hence, as the toner coupling 321 rotates, the agitator 20 is rotatable about the first axis A1 together with the toner coupling 321.

The toner coupling 321 has one end portion and another end portion. The one end portion of the toner coupling 321 is distant from the other end portion of the toner coupling 321 in the first direction. The one end portion of the toner coupling 321 is farther from the one end portion 11 of the casing 10 than the other end portion of the toner coupling 321 is from the one end portion 11 of the casing 10 in the first direction. In other words, the other end portion of the toner coupling 321 is closer to the one end portion 11 of the casing 10 than the one end portion of the toner coupling 321 is to the one end portion 11 of the casing 10 in the first direction.

The planet carrier 322 extends radially outwardly from the other end portion in the first direction of the toner coupling 321. In the present embodiment, the toner coupling 321 and the planet carrier 322 are integral with each other. However, the toner coupling 321 and the planet carrier 322 may be provided as discrete members from each other, provided that the planet carrier 322 is rotatable about the first axis A1 together with the toner coupling 321.

A first planet pin 323*a*, a second planet pin 323*b*, a third planet pin 323*c*, and a fourth planet pin 323*d* are provided on the planet carrier 322 to extend therefrom outwardly in the first direction away from the first end portion 11 of the casing 10. These pins 323*a*, 323*b*, 323*c*, 323*d* are solid cylindrical in shape. These pins 323*a*, 323*b*, 323*c*, 323*d* are arrayed with one another at intervals in a circumferential direction of the planet carrier 322 about the first axis A1. Preferably, these pins 323*a*, 323*b*, 323*c*, 323*d* are arrayed with one another in the circumferential direction at a constant angular interval of 90 degrees between neighboring pins.

The first planetary gear 33*a*, the second planetary gear 33*b*, the third planetary gear 33*c*, and the fourth planetary gear 33*d* are arrayed with one another in the circumferential direction about the first axis A1 at intervals. Preferably, these planetary gears 33*a*, 33*b*, 33*c*, 33*d* are arrayed with one another in the circumferential direction with a constant angular interval of 90 degrees between neighboring planetary gears.

Specifically, the first planetary gear 33*a* has a first hole 331*a* at a center thereof. The first planet pin 323*a* extends through the first hole 331*a*. The first planetary gear 33*a* is supported by the first planet pin 323*a*. The first planetary gear 33*a* is rotatable about a first planet axis 332*a* relative to the planet carrier 322 in a state where the first planet pin 323*a* is inserted in the first hole 331*a*. An outer surface of the first planetary gear 33*a* has a plurality of gear teeth 333*a*.

The second planetary gear 33*b* has a second hole 331*b* at a center thereof. The second planet pin 323*b* extends through the second hole 331*b*. The second planetary gear 33*b* is supported by the second planet pin 323*b*. The second planetary gear 33*b* is rotatable about a second planet axis 332*b* relative to the planet carrier 322 in a state where the second planet pin 323*b* is inserted in the second hole 331*b*. An outer surface of the second planetary gear 33*b* has a plurality of gear teeth 333*b*.

The third planetary gear 33*c* has a third hole 331*c* at a center thereof. The third planet pin 323*c* extends through the third hole 331*c*. The third planetary gear 33*c* is supported by the third planet pin 323*c*. The third planetary gear 33*c* is rotatable about a third planet axis 332*c* relative to the planet carrier 322 in a state where the third planet pin 323*c* is inserted in the third hole 331*c*. An outer surface of the third planetary gear 33*c* has a plurality of gear teeth 333*c*.

The fourth planetary gear 33*d* has a fourth hole 331*d* at a center thereof. The fourth planet pin 323*d* extends through the fourth hole 331*d*. The fourth planetary gear 33*d* is supported by the fourth planet pin 323*d*. The fourth planetary gear 33*d* is rotatable about a fourth planet axis 332*d* relative to the planet carrier 322 in a state where the fourth planet pin 323*d* is inserted in the fourth hole 331*d*. An outer surface of the fourth planetary gear 33*d* has a plurality of gear teeth 333*d*.

In the present embodiment, the single planet carrier 322 supports the first planetary gear 33*a*, the second planetary gear 33*b*, the third planetary gear 33*c*, and the fourth planetary gear 33*d*. Hence, accurate positioning of the second planetary gear 33*b*, the third planetary gear 33*c*, and the fourth planetary gear 33*d* with respect to the first planetary gear 33*a* can be attained.

Further, in response to the rotations of the toner coupling 321 about the first axis A1, the first planetary gear 33*a*, the second planetary gear 33*b*, the third planetary gear 33*c*, and the fourth planetary gear 33*d* rotate about the first axis A1 along with the rotations of the toner coupling 321 and the planet carrier 322. As such, the first planetary gear 33*a*, the second planetary gear 33*b*, the third planetary gear 33*c*, and the fourth planetary gear 33*d* are rotatable about their planet axes 332*a*, 332*b*, 332*c* and 332*d*, respectively, and are also rotatable around the sun gear 351 as will be described later.

The ring gear 34 is annular in shape surrounding the first planetary gear 33*a*, the second planetary gear 33*b*, the third planetary gear 33*c*, and the fourth planetary gear 33*d*. The ring gear 34 has a central axis coincident with the first axis A1. An inner peripheral surface of the ring gear 34 has a plurality of gear teeth 342. The gear teeth 333*a* of the first planetary gear 33*a*, the gear teeth 333*b* of the second planetary gear 33*b*, the gear teeth 333*c* of the third planetary gear 33*c*, and the gear teeth 333*d* of the fourth planetary gear 33*d* respectively mesh with the gear teeth 342 of the ring gear 34.

The ring gear 34 has two arms 341*a* and 341*b*. The two arms 341*a* and 341*b* extend radially outwardly from an outer peripheral surface of the ring gear 34. That is, the two arms 341*a*, 341*b* extends in a direction away from the first planetary gear 33*a*, the second planetary gear 33*b*, the third planetary gear 33*c*, and the fourth planetary gear 33*d* with respect to the gear teeth 342 of the ring gear 34. The arm 341*a* is fitted in the second recess 165*a* of the holder 161. The arm 341*b* is fitted in the fifth recess 165*b* of the holder 161. Hence, the shutter 16 is rotatable with the ring gear 34. Accordingly, in response to the rotations of the ring gear 34 about the first axis A1, the shutter 16 rotates about the first axis A1 with the ring gear 34.

The sun gear 351 is rotatable about the first axis A1. The first planetary gear 33*a*, the second planetary gear 33*b*, the third planetary gear 33*c*, and the fourth planetary gear 33*d* are positioned around the sun gear 351. An outer peripheral surface of the sun gear 351 has a plurality of gear teeth 354. The gear teeth 333*a* of the first planetary gear 33*a*, the gear teeth 333*b* of the second planetary gear 33*b*, the gear teeth 333*c* of the third planetary gear 33*c*, and the gear teeth 333*d* of the fourth planetary gear 33*d* mesh with the gear teeth 354 of the sun gear 351. The sun gear 351 has a circular hole 351A whose center is coincident with the first axis A1. The toner coupling 321 is inserted in the hole 351A of the sun gear 351.

The toner coupling 321, the sun gear 351, the four planetary gears 33*a*, 33*b*, 33*c*, 33*d*, and the ring gear 34 are positioned at a plane extending perpendicular to the first axis A1. Specifically, in the radial direction of the agitator shaft 21 which is perpendicular to the first axis A1, the sun gear 351 is positioned farther from the first axis A1 than the toner coupling 321 is from the first axis A1. In the radial direction of the agitator shaft 21, the first planetary gear 33*a*, the second planetary gear 33*b*, the third planetary gear 33*c*, and the fourth planetary gear 33*d* are positioned farther from the first axis A1 than the sun gear 351 is from the first axis A1. In the radial direction of the agitator shaft 21, the ring gear 34 is positioned farther from the first axis A1 than the planetary gears 33*a*, 33*b*, 33*c*, 33*d* are from the first axis A1. In other words, the toner coupling 321, the sun gear 351, the planetary gears 33*a*, 33*b*, 33*c*, 33*d*, and the ring gear 34 are aligned with one another in the radial direction of the agitator shaft 21. With this structure, the toner cartridge 2 can have a reduced dimension in the first direction.

The sun gear 351 has one end portion and another end portion. The one end portion is distant from the other end portion in the first direction. The one end portion of the sun gear 351 is positioned farther from the first end portion 11 of the casing 10 than the other end portion of the sun gear 351 is from the first end portion 11 in the first direction. In other words, the other portion of the sun gear 351 is positioned closer to the first end portion 11 of the casing 10 than the one end portion of the sun gear 351 is to the first end portion 11 in the first direction.

The rotary plate 352 extends radially outwardly from the one end portion of the sun gear 351. The rotary plate 352 is rotatable about the first axis A1 with the sun gear 351. In the present embodiment, the rotary plate 352 is integral with the sun gear 351. However, the rotary plate 352 may be a discrete member with respect to the sun gear 351, as long as the rotary plate 352 and the sun gear 351 are rotatable together about the first axis A1. An outer peripheral surface of the rotary plate 352 has a plurality of grooves 353. The plurality of grooves 353 are arrayed with one another in a circumferential direction of the rotary plate 352 at intervals. Preferably, the plurality of grooves 353 be arrayed with one another in the circumferential direction with an equal interval between neighboring grooves. Each groove 353 is recessed radially inward from the outer peripheral surface of the rotary plate 352. Each groove 353 has an arcuate shape as viewed in the first direction.

The cover 36 is coupled to the first end portion 11 of the casing 10. The cover 36 includes a gear cover part 361 and a shutter cover part 362. The gear cover part 361 has a generally disc shape which is centered on the first axis A1. The shutter cover part 362 extends in the first direction toward the casing 10 from a part of an outer peripheral portion of the gear cover part 361. The return springs 31*a*, 31*b*, the toner coupling 321, the planet carrier 322, the first planetary gear 33*a*, the second planetary gear 33*b*, the third planetary gear 33*c*, the fourth planetary gear 33*d*, the ring gear 34, the sun gear 351, the rotary plate 352, and the two bosses 37*a*, 37*b* are positioned between the first end portion 11 of the casing 10 and the gear cover part 361 in the first direction. The shutter cover part 362 covers at least a part of the shutter plate 162 of the shutter 16.

The shutter cover part 362 has the communication opening 363. The communication opening 363 overlaps with the toner discharge opening 15 irrespective of whether the shutter 16 is at the open position or at the closed position. The communication opening 363 is closed by the shutter plate 162 when the shutter 16 is at the closed position. The shutter opening 163 becomes aligned with the toner discharge opening 15 and the communication opening 363 when the shutter 16 is at the open position. Hence, the accommodation chamber 14 and the outside of the casing 10 are communicated with each other through the toner discharge opening 15, the shutter opening 163, and the communication opening 363.

Figure 11:
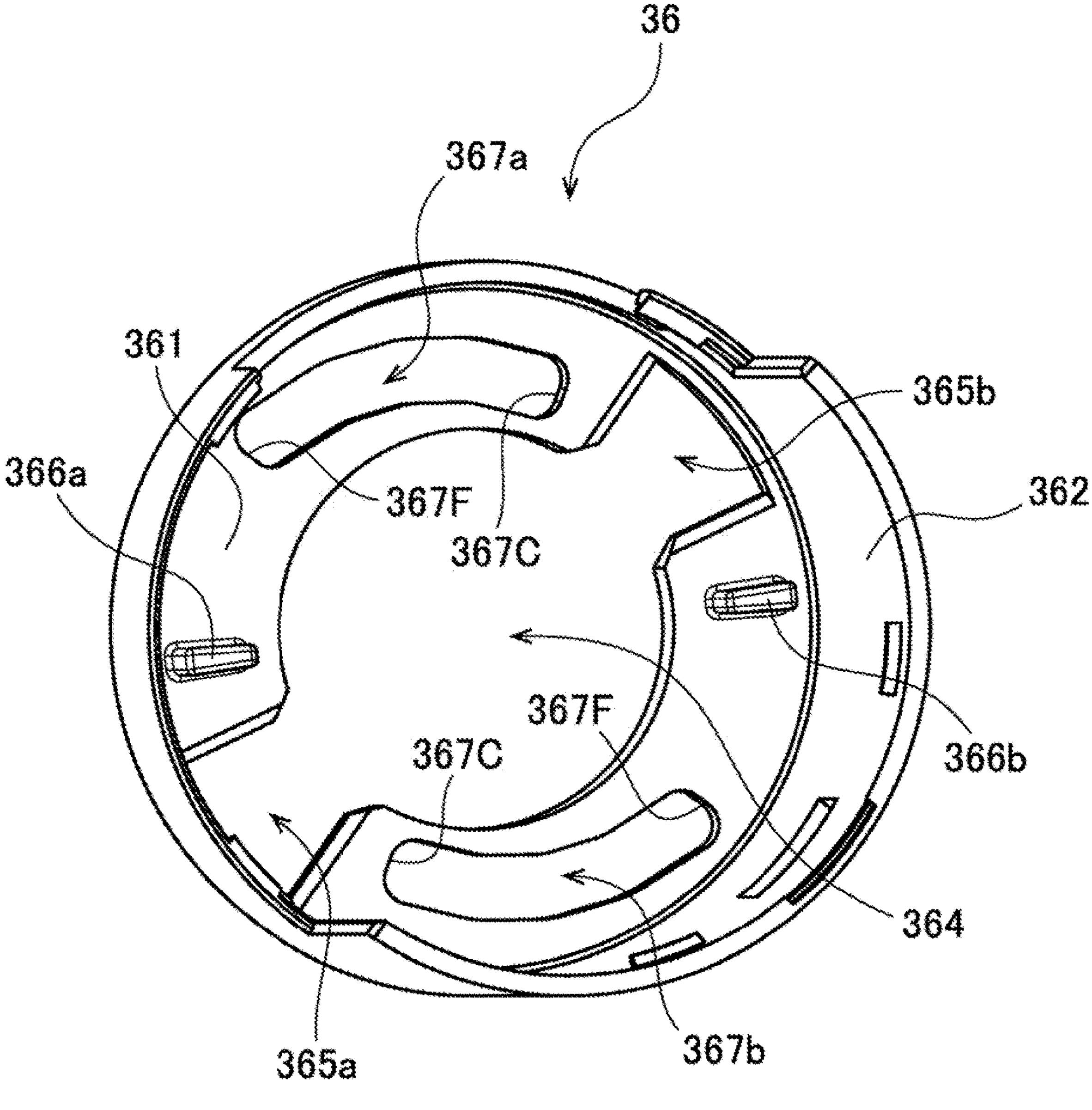
FIG. 11 is a perspective view illustrating a cover in the toner cartridge according to the embodiment as viewed in the first direction.

FIG. 11 illustrates the cover 36 as viewed in the first direction, specifically, in a direction from the second end portion 12 toward the first end portion 11 of the casing 10. As illustrated in FIG. 11, the cover 36 has a central through-hole 364, two side through-holes 365*a* and 365*b*, the two spring seats 366*a* and 366*b*, and two guide grooves 367*a* and 367*b*.

The central through-hole 364 and the two side through-holes 365*a*, 365*b* extend throughout a thickness of the gear cover part 361 in the first direction. The central through-hole 364 is positioned at a center portion of the gear cover part 361. The central through-hole 364 has a circular shape as viewed in the first direction. The toner coupling 321 extends through the central through-hole 364 to be exposed to the outside of the cover 36. The two side through-holes 365*a*, 365*b* are positioned around the central through-hole 364 such that the two side through-holes 365*a*, 365*b* are positioned diametrically opposite to each other with respect to the central through-hole 364. The two side through-holes

Figure 12:
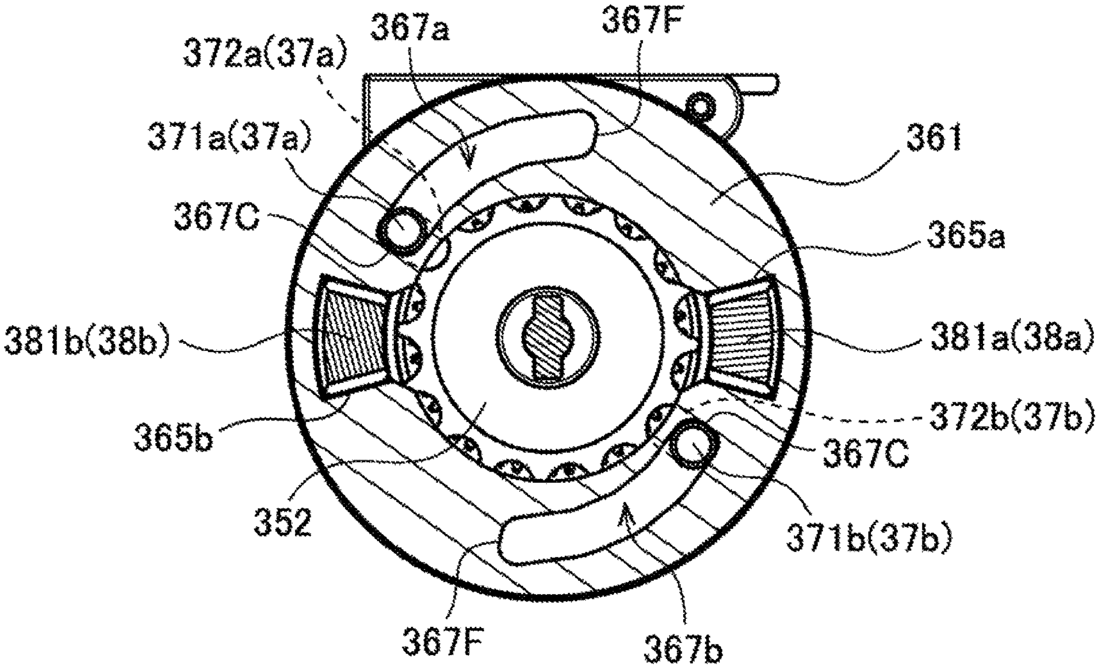
FIG. 12 is a cross-sectional view of the toner cartridge according to the embodiment taken along a line XII-XII in FIG. 9, and particularly illustrating a closed position of a shutter.

365*a*, 365*b* have a rectangular shape as viewed in the first direction. As illustrated in FIG. 12, the locking member 38*a* which will be described later extends through the side through-hole 365*a* to be exposed to the outside of the cover 36; and the locking member 38*b* which will be described later extends through the side through-hole 365*b* to be exposed to the outside of the cover 36.

The two spring seats 366*a*, 366*b* protrudes in the first direction toward the shutter 16 (inward) from the gear cover part 361. The two spring seats 366*a*, 366*b* are positioned diametrically opposite to each other with respect to the central through-hole 364. The spring seat 366*a* is connected to the other end of the return spring 31*a* as described above. The spring seat 366*b* is connected to the other end of the return spring 31*b* as described above.

The guide groove 367*a* is configured to guide the boss 37*a*. The guide groove 367*b* is configured to guide the boss 37*b*. The two guide grooves 367*a*, 367*b* are positioned at a surface of the gear cover part 361, the surface facing the shutter 16 in the first direction. The two guide grooves 367*a*, 367*b* are positioned opposite to each other with respect to the central through-hole 364. Each of the two guide grooves 367*a*, 367*b* extends generally in the rotational direction of the shutter 16. Each of the two guide grooves 367*a*, 367*b* has an arcuate shape when viewed in the first direction. Each of the two guide grooves 367*a*, 367*b* has one end 367C and another end 367F in the rotational direction of the shutter 16. The one end 367C is positioned closer to the first axis A1 than the other end 367F is to the first axis A1.

The two bosses 37*a*, 37*b* are positioned around the rotary plate 352. The boss 37*a* is movably positioned in the second recess 165*a* of the holder 161. The boss 37*b* is movably positioned in the fifth recess 165*b* of the holder 161. Hence, by the rotations of the shutter 16 about the first axis A1, the boss 37*a* moves in the circumferential direction of the holder 161 about the first axis A1 with the second recess 165*a*, and the boss 37*b* moves in the circumferential direction of the holder 161 about the first axis A1 with the fifth recess 165*b*.

Figure 13:
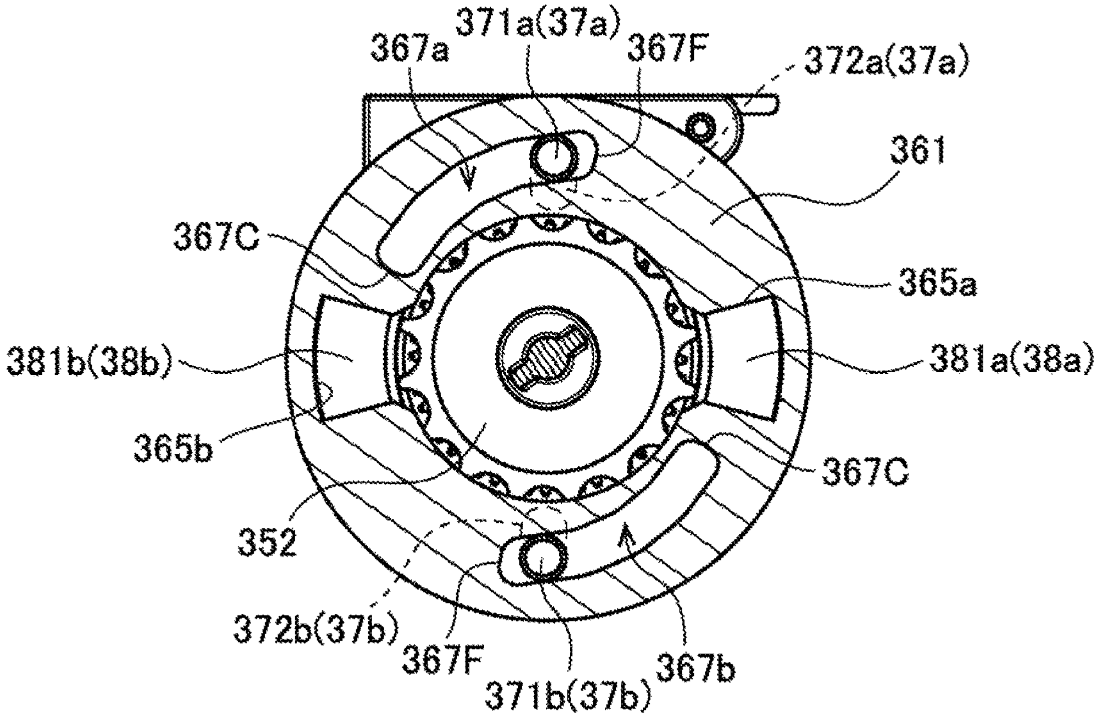
FIG. 13 is another cross-sectional view of the toner cartridge according to the embodiment taken along the line XII-XII in FIG. 9, and particularly illustrating an open position of the shutter.

The boss 37*a* has a guide protrusion 371*a*. The guide protrusion 371*a* protrudes from the boss 37*a* outward in the first direction toward the guide groove 367*a*. The boss 37*b* has a guide protrusion 371*b*. The guide protrusion 371*b* protrudes from the boss 37*b* outward in the first direction toward the guide groove 367*b*. FIGS. 12 and 13 are cross-sectional views taken along the line XII-XII in FIG. 9. FIG. 12 illustrates the closed position of the shutter 16, and FIG. 13 illustrates the open position of the shutter 16. As illustrated in FIGS. 12 and 13, a tip end portion of the guide protrusion 371*a* is inserted in the guide groove 367*a* of the cover 36, and a tip end portion of the guide protrusion 371*b* is inserted in the guide groove 367*b* of the cover 36.

The second recess 165*a* of the shutter 16 extends in the radial direction about the first axis A1. Therefore, the boss 37*a* is movable between a first position (FIG. 12) and a second position (FIG. 13) positioned radially outward of the first position along the second recess 165*a* in accordance with the movement of the guide protrusion 371*a* along the guide groove 367*a*. In a state where the boss 37*a* is at the first position, a radially-inward end portion 372*a* of the boss 37*a* is positioned in one of the grooves 353 of the rotary plate 352. In a state where the boss 37*a* is at the second position, the boss 37*a* in an entirety thereof is positioned outside of any of the groove 353 of the rotary plate 352. Since the plurality of the grooves 353 is arranged on the entire outer peripheral surface of the rotary plate 352, the boss 37*a* can be inserted in the groove 353 regardless of the rotational position of the rotary plate 352.

The fifth recess 165*b* extends in the radial direction about the first axis A1. Therefore, the boss 37*b* is movable between a first position (FIG. 12) and a second position (FIG. 13) positioned radially outward of the first position along the fifth recess 165*b* in accordance with the movement of the guide protrusion 371*b* along the guide groove 367*b*. In a state where the boss 37*b* is at the first position, a radially-inward end portion 372*b* of the boss 37*b* is positioned in one of the grooves 353 of the rotary plate 352. In a state where the boss 37*b* is at the second position, the boss 37*b* in an entirety thereof is positioned outside of any the groove 353 of the rotary plate 352. The boss 37*b* can also be inserted in the groove 353 regardless of the rotational position of the rotary plate 352.

In a case where the relay coupling 82 (described later) is not connected to the toner coupling 321, that is, in a case where no driving force is supplied to the toner coupling 321, the return springs 31*a*, 31 *b* are in the first state because of the resiliency thereof, and hence, the shutter 16 is at the closed position. Accordingly, the toner discharge opening 15 is closed by the shutter plate 162.

At this time, as illustrated in FIG. 12, the guide protrusion 371*a* of the boss 37*a* is positioned at the one end 367C of the guide groove 367*a*, and the guide protrusion 371*b* of the boss 37*b* is positioned at the one end 367C of the guide groove 367*b*. As such, the bosses 37*a*, 37*b* are positioned at the first position (FIG. 12). Accordingly, the radially-inward end portions 372*a*, 372*b* of the bosses 37*a*, 37*b* are respectively inserted in two of the grooves 353 of the rotary plate 352.

That is, the boss 37*a* is fitted in both the second recess 165*a* of the shutter 16 and one of the grooves 353 of the rotary plate 352. Further, the boss 37*b* is fitted in both the fifth recess 165*b* of the shutter 16 and another one of the grooves 353 of the rotary plate 352. Consequently, the shutter 16 and the ring gear 34 are rotatable together with the sun gear 351, the rotary plate 352, and the bosses 37*a*, 37*b*.

In this state, the ring gear 34 is not rotatable relative to the sun gear 351. That is, the ring gear 34 is rotatable with the sun gear 351. Hence, the first planetary gear 33*a* meshing with both the ring gear 34 and the sun gear 351 is not rotatable about the first planet axis 332*a*. In the same manner, the second planetary gear 33*b* is not rotatable about the second planet axis 332*b*; the third planetary gear 33*c* is not rotatable about the third planet axis 332*c*; and the fourth planetary gear 33*d* is not rotatable about the fourth planet axis 332*d*.

When the driving force is supplied to the toner coupling 321 with this state, the shutter 16 is rotated by the rotation of the toner coupling 321 together with the rotations of planet carrier 322, the first planetary gear 33*a*, the second planetary gear 33*b*, the third planetary gear 33*c*, the fourth planetary gear 33*d*, the sun gear 351, the rotary plate 352, the two bosses 37*a*, 37*b*, and the ring gear 34 about the first axis A1. As a result, the shutter 16 moves from the closed position to the open position, and hence, the toner discharge opening 15 is opened.

In accordance with the rotation of the shutter 16, the return springs 31*a*, 31 *b* are stretched and are changed from the first state to the second state. The movement of the shutter 16 is stopped upon abutment of the shutter plate 162 with the first stopper surface 18. At this time, as illustrated in FIG. 13, the guide protrusion 371*a* of the boss 37*a* moves from the one end 367C to the other end 367F of the guide groove 367*a*, and the guide protrusion 371*b* of the boss 37*b* moves from the one end 367C to the other end 367F of the guide groove 367*b*.

In response to the movement of the guide protrusions 371*a* and 371*b*, the boss 37*a* moves from the first position to the second position along the second recess 165*a*, and the boss 37*b* moves from the first position to the second position along the fifth recess 165*b*. Hence, the bosses 37*a*, 37*b* move away from the grooves 353 of the rotary plate 352. That is, the boss 37*a* is fitted in the second recess 165*a* of the shutter 16 but is disengaged from any of the grooves 353 of the rotary plate 352; and the boss 37*b* is fitted in the fifth recess 165*b* of the shutter 16 but is disengaged from any of the groove 353 of the rotary plate 352. Consequently, the sun gear 351 and the rotary plate 352 becomes rotatable relative to the shutter 16 and the ring gear 34.

As described above, abutment of the shutter plate 162 of the shutter 16 with the first stopper surface 18 stops the rotation of the shutter 16 and the ring gear 34. However, the sun gear 351 becomes rotatable relative to the ring gear 34, since the bosses 37*a*, 37*b* are separated from the grooves 353 of the rotary plate 352. Therefore, the first planetary gear 33*a* meshing with the ring gear 34 and the sun gear 351 is rotatable about the first planet axis 332*a*. Likewise, the second planetary gear 33*b* meshing with the ring gear 34 and the sun gear 351 is rotatable about the second planet axis 332*b*; the third planetary gear 33*c* meshing with the ring gear 34 and the sun gear 351 is rotatable about the third planet axis 332*c*; and the fourth planetary gear 33*d* meshing with the ring gear 34 and the sun gear 351 is rotatable about the fourth planet axis 332*d*.

Accordingly, the first planetary gear 33*a*, the second planetary gear 33*b*, the third planetary gear 33*c*, and the fourth planetary gear 33*d* move around the sun gear 351 in a circumferential direction thereof while rotating about their planet axes 332*a*, 332*b*, 332*c* and 332*d*, respectively. Further, the sun gear 351 is rotated about the first axis A1 due to the meshing with the first planetary gear 33*a*, the second planetary gear 33*b*, the third planetary gear 33*c*, and the fourth planetary gear 33*d*. Here, a rotation speed of the sun gear 351 is higher than that of the toner coupling 321.

In this way, in a state where the bosses 37*a*, 37*b* are at the second position, the first planetary gear 33*a*, the second planetary gear 33*b*, the third planetary gear 33*c*, the fourth planetary gear 33*d*, and the sun gear 351 are rotatable relative to the ring gear 34. Hence, in accordance with the rotation of the toner coupling 321, the planetary gears 33*a*, 33*b*, 33*c*, 33*d* are in rotatable state but the ring gear 34 is in non-rotatable state. Therefore, the shutter 16 is kept at the open position, regardless of further rotations of the toner coupling 321 after the shutter 16 moves to the open position.

Further, the toner coupling 321 is connected to the one end portion of the agitator shaft 21 as described above. Therefore, the agitator 20 is rotatable about the first axis A1 in accordance with the rotation of the toner coupling 321 about the first axis A1. Hence, the agitator 20 can continue to rotate by the rotation of the toner coupling 321 even after the shutter 16 is held at the open position. Thus, the toner in the casing 10 can be agitated by the agitator 20.

As such, the toner cartridge 2 realizes both the movement of the shutter 16 and the rotation of the agitator 20 in response to the rotation of the toner coupling 321. Specifically, the rotation of the toner coupling 321 causes the rotation of the agitator 20 and the movement of the shutter 16 from the closed position to the open position. Further, in accordance with the movement of the shutter 16 from the closed position to the open position, the bosses 37*a*, 37*b* move from the first position to the second position. Hence, the first planetary gear 33*a*, the second planetary gear 33*b*, the third planetary gear 33*c*, the fourth planetary gear 33*d*, and the sun gear 351 become rotatable freely while the ring gear 34 becomes non-rotatable. As a result, the agitator 20 can continue to rotate while the shutter 16 is maintained at the open position.

Thereafter, upon halt of the power supply to the toner coupling 321, the return springs 31*a*, 31 *b* are compressed because of resiliency thereof and are changed from the second state to the first state. Hence, the shutter 16 moves from the open position to the closed position, thereby causing the toner discharge opening 15 to be closed again by the shutter plate 162.

The two locking members 38*a*, 38*b* are configured to lock the rotational position of the shutter 16. The locking member 38*a* is configured to be fitted in the third recess 166*a* of the holder 161. The locking member 38*b* is configured to be fitted in the sixth recess 166*b* of the holder 161.

Specifically, the locking member 38*a* includes a base 383*a*, a locking protrusion 381*a*, and a locking spring 382*a*. The locking protrusion 381*a* protrudes from the base 383*a* toward the side through-hole 365*a* of the cover 36. The locking member 38*a* is movable between a locking position and a release position in the first direction. At the locking position of the locking member 38*a*, the locking protrusion 381*a* is positioned outside of the second recess 165*a* of the shutter 16 and the base 383*a* is positioned in the second recess 165*a*. At the release position of the locking member 38*a*, the locking protrusion 381*a* is positioned inside the second recess 165*a* and the base 383*a* is positioned in the second recess 165*a*.

The locking spring 382*a* is interposed between the base 383*a* and the holder 161. The locking spring 382*a* is an elastic member, and more specifically, a compression spring. A length of the locking spring 382*a* in the first direction is changeable between a stretched state and a compressed state. The length in the first direction of the locking spring 382*a* in the stretched state is longer than the length in the compressed state. The locking member 38*a* is at the locking position in the stretched state of the locking spring 382*a*. The locking member 38*a* is at the release position in the compressed state of the locking spring 382*a*. The locking protrusion 381*a* is normally urged toward the locking position (to be inserted in the side through-hole 365*a* of the cover 36) in the first direction by the resilient force of the locking spring 382*a*.

Likewise, the locking member 38*b* includes a base 383*b*, a locking protrusion 381*b*, and a locking spring 382*b*. The locking protrusion 381*b* protrudes from the base 383*b* toward the side through-hole 365*b* of the cover 36. The locking member 38*b* is movable between a locking position and a release position in the first direction. At the locking position of the locking member 38*b*, the locking protrusion 381*b* is positioned outside of the sixth recess 165*b* but the base 383*b* is positioned in the sixth recess 165*b*. At the release position of the locking member 38*b*, the locking protrusion 381*b* is positioned inside the sixth recess 165*b* and the base 383*b* is positioned in the sixth recess 165.

The locking spring 382*b* is interposed between the base 383*b* and the holder 161. The locking spring 382*b* is an elastic member, and more specifically, a compression spring. A length of the locking spring 382*b* in the first direction is changeable between a stretched state and a compressed state. The length in the first direction of the locking spring 382*b* in the stretched state is longer than the length in the compressed state. The locking member 38*b* is at the locking position in the stretched state of the locking spring 382*b*. The locking member 38*b* is at the release position in the compressed state of the locking spring 382*b*. The locking protrusion 381*b* is normally urged toward the locking position (to be inserted in the side through-hole 365*b* of the cover 36) in the first direction by the resilient force of the locking spring 382*b*.

The locking protrusion 381*a* is inserted in the side through-hole 365*a* when the locking member 38*a* is at the locking position, i.e., when the locking spring 382*a* is in the stretched state. The locking protrusion 381*b* is inserted in the side through-hole 365*b* when the locking member 38*b* is at the locking position, i.e., when the locking spring 382*b* is in the stretched state.

In the state where the locking protrusion 381*a* is inserted in the side through-hole 365*a*, the locking member 38*a* is in contact with both the cover 36 and the holder 161. Likewise, in the state where the locking protrusion 381*b* is inserted in the side through-hole 365*b*, the locking member 38*b* is in contact with both the cover 36 and the holder 161. In this state, the shutter 16 is not rotatable about the first axis A1 relative to the casing 10 and the cover 36. Accordingly, the shutter 16 is immovable from the closed position toward the open position.

As will be described later, the drum cartridge 3 includes a corresponding unlock member 81 configured to push both the locking protrusion 381*a* and the locking protrusion 381*b* toward the holder 161 in the first direction. The locking spring 382*a* and the locking spring 382*b* are shrunk from the stretched state to the compressed state when the locking protrusion 381*a* and the locking protrusion 381*b* are pushed by the unlock member 81. Hence, the locking members 38*a*, 38*b* move from the locking position to the release position. That is, the locking protrusions 381*a*, 381*b* are disengaged from the side through-holes 365*a*, 365*b* of the cover 36, respectively, so that the locking members 38*a*, 38*b* are separated from the cover 36. Accordingly, the locking members 38*a*, 38*b* and the shutter 16 become rotatable about the first axis A1 with respect to the casing 10 and the cover 36. Consequently, the shutter 16 is movable from the closed position to the open position.

According to the present embodiment, the shutter 16 cannot be unlocked unless the two locking protrusions 381*a*, 381*b* are simultaneously depressed. This structure can prevent the shutter 16 from accidentally being unlocked by user's erroneous operation in a state where the toner cartridge 2 is not attached to the drum cartridge 3.

Figure 14:
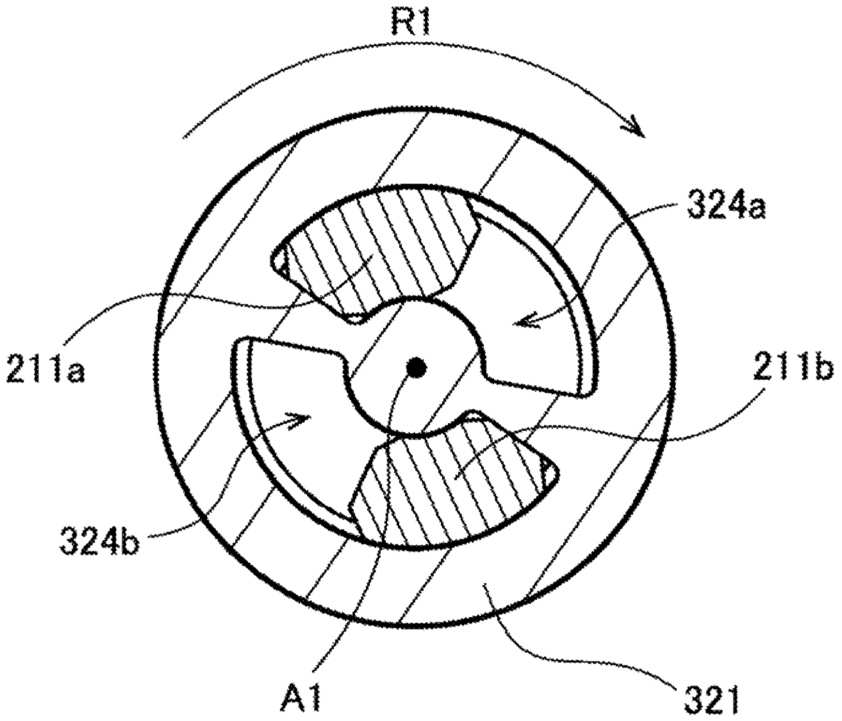
FIG. 14 is a cross-sectional view of a connecting portion between an agitator shaft and a toner coupling in the toner cartridge according to the embodiment taken along a line XIV-XIV in FIG. 9, and particularly illustrating a state where the shutter is at the open position.
Figure 15:
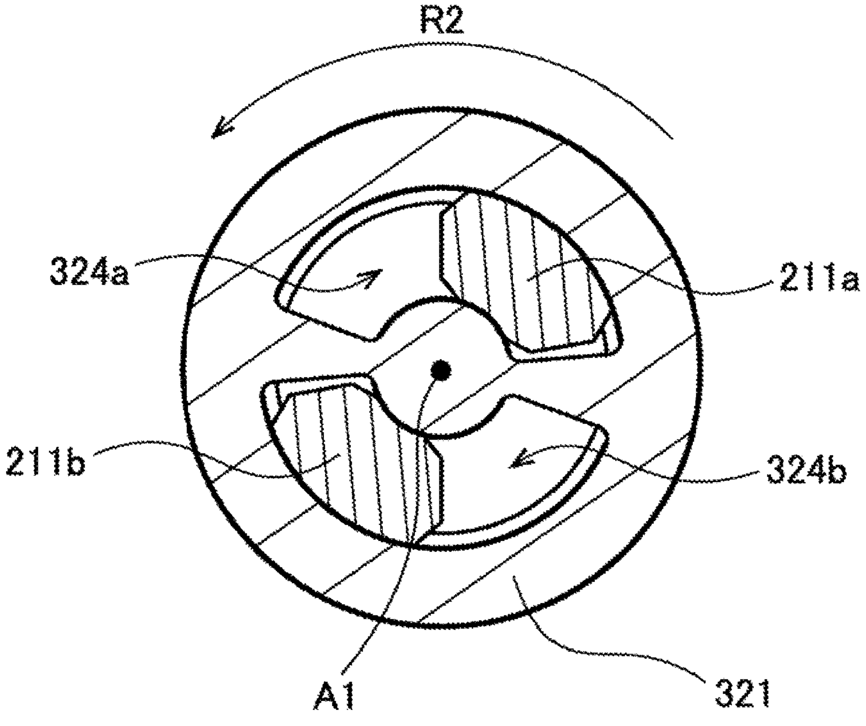
FIG. 15 is a cross-sectional view the connecting portion between the agitator shaft and the toner coupling in the toner cartridge according to the embodiment taken along the line XIV-XIV in FIG. 9, and particularly illustrating a state where the shutter is at the closed position.

FIGS. 14 and 15 are cross-sectional views taken along the line XIV-XIV in FIG. 9 illustrating a connecting portion between the agitator shaft 21 and the toner coupling 321. As illustrated in FIGS. 14 and 15, the toner coupling 321 has two clutch holes 324*a*, 324*b*. The two clutch holes 324*a*, 324*b* are through-holes extending throughout a length of the toner coupling 321 in the first direction, or recesses recessed in the first direction. The clutch holes 324*a*, 324*b* have an arcuate shape centered on the first axis A1.

The agitator shaft 21 has two clutch pawls 211*a*, 211*b*. The clutch pawls 211*a*, 211*b* are positioned at the one end portion in the first direction of the agitator shaft 21. The clutch pawls 211*a* and 211*b* are inserted in the clutch holes 324*a* and 324*b*, respectively. The clutch hole 324*a* has a length in a circumferential direction about the first axis A1 which is greater than that of the clutch pawl 211*a*. The clutch hole 324*b* has a length in the circumferential direction about the first axis A1 which is greater than that of the clutch pawl 211*b*. Further, each of the clutch holes 324*a*, 324*b* has a central angle about the first axis A1 approximately equal to or greater than the rotational angle of the shutter 16 between the closed position and the open position about the first axis A1.

For moving the shutter 16 from the closed position toward the open position, the toner coupling 321 is rotated about the first axis A1 in a rotational direction (as indicted by an arrow R1 in FIG. 14) which is the same as the moving direction of the shutter 16 from the closed position toward the open position. At this time, the clutch pawl 211*a* is in contact with one end of the clutch holes 324*a* in the circumferential direction, and the clutch pawl 211*b* is in contact with one end of the clutch hole 324*b* in the circumferential direction, as illustrated in FIG. 14. Hence, the rotation of the toner coupling 321 is transmitted to the agitator 20. Accordingly, the agitator 20 rotates together with the toner coupling 321 in the rotational direction R1 coincident with the moving direction of the shutter 16 from the closed position to the open position. Further, the agitator 20 rotates by the rotation of the toner coupling 321 even after the shutter 16 moves to the closed position from the open position.

For moving the shutter 16 from the open position toward the closed position, the toner coupling 321 is rotated with the shutter 16 about the first axis A1 in a rotational direction (as indicted by an arrow R2 in FIG. 15) which is the same as the moving direction of the shutter 16 from the open position toward the closed position. That is, the rotational direction R2 of the toner coupling 321 when the shutter 16 moves from the open position toward the closed position is opposite to the rotational direction R1 of the toner coupling 321 when the shutter 16 moves from the closed position toward the open position. At this time, the one end in the circumferential direction of the clutch hole 324*a* is separated from the clutch pawl 211*a*, and the one end in the circumferential direction of the clutch hole 324*b* is separated from the clutch pawl 211*b*.

However, the other end in the circumferential direction of the clutch hole 324*a* does not contact the clutch pawl 211*a*, and the other end in the circumferential direction of the clutch hole 324*b* does not contact the clutch pawl 211*b*, either. Therefore, the rotation of the toner coupling 321 is not transmitted to the agitator 20. Accordingly, the agitator 20 is prevented from being rotated in a direction coincident with the rotational direction of the shutter 16 from the open position to the closed position.

In this way, in the present embodiment, the clutch holes 324*a*, 324*b* and the clutch pawls 211*a*, 211*b* constitute a clutch for preventing the agitator 20 from rotating together with the toner coupling 321 in a case where the shutter 16 moves from the open position to the closed position.

The IC chip assembly 40 is positioned at the second end portion 12 of the casing 10.

The IC chip assembly 40 includes the IC chip 41 and a chip holder 42 holding the IC chip 41. The IC chip 41 is fixed to an outer surface of the chip holder 42. The IC chip 41 is configured to store therein various information about the toner cartridge 2, such as a volume of toner to be stored in the toner cartridge 2 and a residual amount of toner. The IC chip 41 may further store other information indicative of a specification of the toner cartridge 2. For example, the IC chip 41 may store such information as: the kind of toner, the manufacturing serial number of the toner cartridge 2, the identification code to certify a genuine product, and devices or models compatible with the toner cartridge 2.

The IC chip 41 has an electrical contact surface 411 (see FIG. 6). The electrical contact surface 411 is made from electrically conductive material such as metal. The electrical contact surface 411 is exposed to the outside on the outer surface of the second end portion 12 of the casing 10. Incidentally, in the IC chip 41, only the electrical contact surface 411 may be exposed to the outside, but a portion of the IC chip 41 other than the electrical contact surface 411 may be arranged on a portion of the casing 10 other than the second end portion 12.

The chip holder 42 is movable in the first direction relative to the casing 10. The electrical contact surface 411 of the IC chip 41 is also movable in the first direction relative to the casing 10 in association with the movement of the chip holder 42 in the first direction.

Further, as indicated by a broken line in FIG. 4, the toner cartridge 2 further includes an IC chip spring 43. The IC chip spring 43 is interposed between the second end portion 12 of the casing 10 and the chip holder 42. In a case where the drum cartridge 3 with the toner cartridges 2 attached thereto is attached to the body frame 4, the electrical contact surface 411 of each IC chip 41 comes in contact with a corresponding one of the drum contacts 91*a*, 91*b*, 91*c*, 91*d*. At this time, the IC chip spring 43 urges the chip holder 42 in the first direction to urge the electrical contact surface 411 into contact with the corresponding drum contact 91*a*, 91*b*, 91*c*, 91*d*. Thus, stabilized electrical contact between the electrical contact surface 411 and the corresponding drum contact 91*a*, 91*b*, 91*c*, 91*d* can be attained.

3. Drum Cartridge

A structure of the drum cartridge 3 will next be described.

Figure 16:
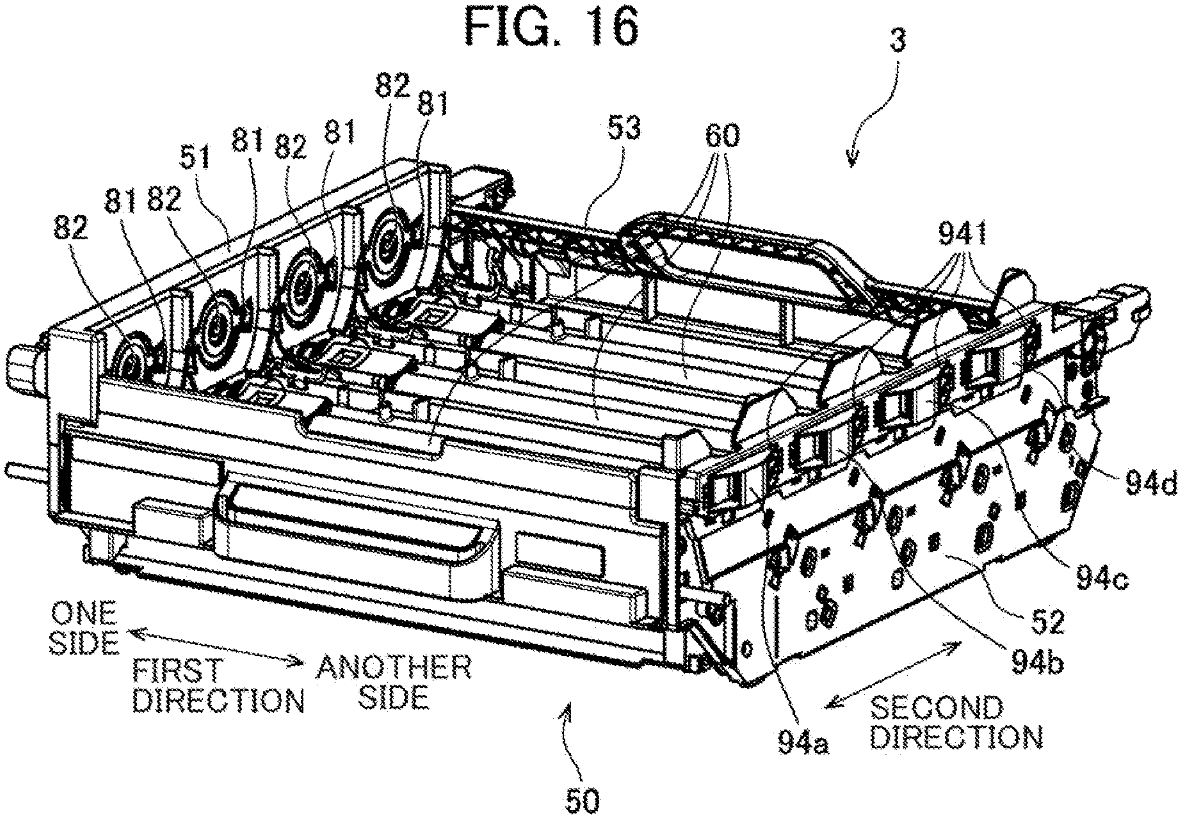
FIG. 16 is a perspective view of a drum cartridge.
Figure 17:
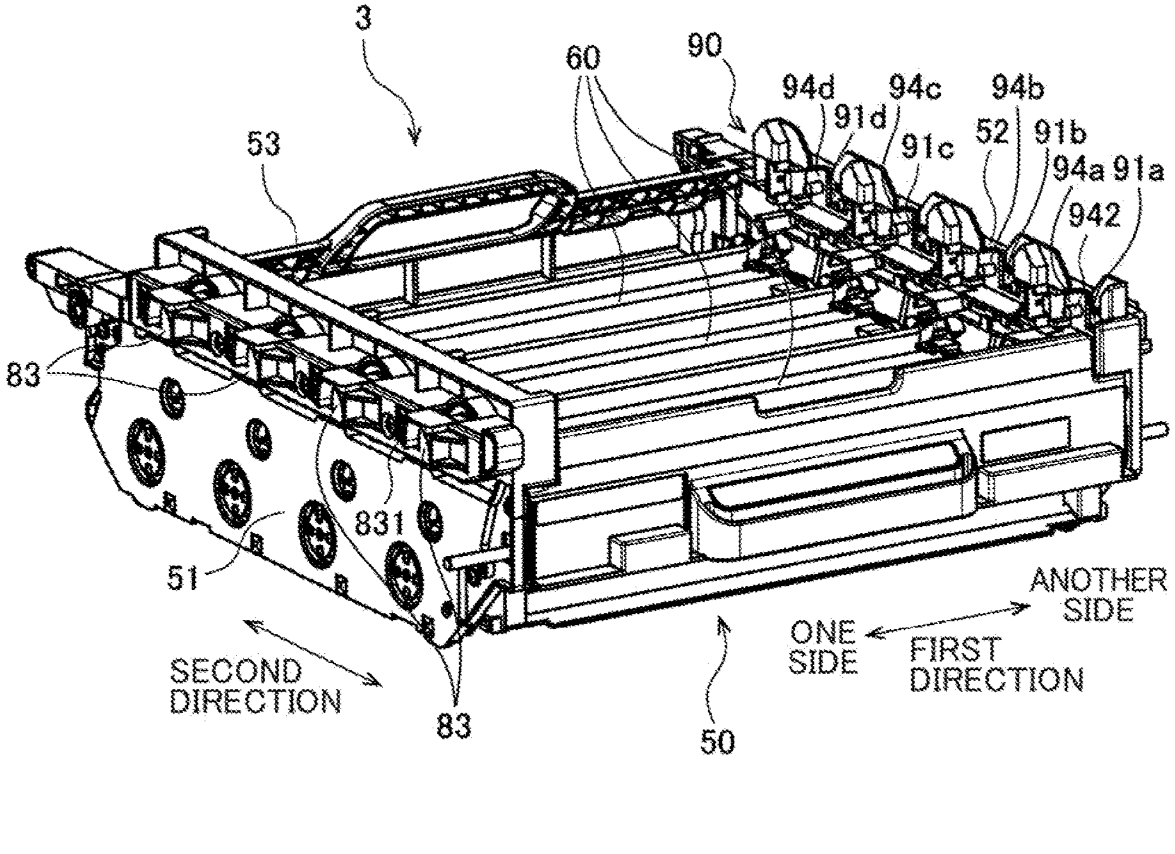
FIG. 17 is another perspective view of the drum cartridge.

FIGS. 16 and 17 are perspective views of the drum cartridge 3. The drum cartridge 3 includes a drum frame 50, four developing rollers 60, four photosensitive drums 70, the four unlock members 81, the four relay couplings 82, four contact members 83, a plurality of tension springs 84, and a wiring portion 90.

Four of the toner cartridges 2 are attachable to the drum frame 50. The drum frame 50 includes a first side frame 51, a second side frame 52, and a third frame 53. The first side frame 51 and the second side frame 52 are generally flat plate shaped extending perpendicularly to the first direction. The first side frame 51 and the second side frame 52 are spaced away from each other in the first direction. The third frame 53 connects the first side frame 51 to the second side frame 52 in the first direction. The four toner cartridges 2 are inserted in a portion between the first side frame 51 and the second side frame 52.

Each developing roller 60 is rotatable about a rotation axis (developing axis) extending in the first direction. The developing roller 60 according to the embodiment is a magnetic roller. The developing roller 60 has one end portion in the first direction supported by the first side frame 51, and another end portion in the first direction supported by the second side frame 52. The four developing rollers 60 are arrayed with one another in the second direction at intervals.

As a result of the attachment of the toner cartridges 2 to the drum frame 50, the toner discharge opening 15 of each toner cartridge 2 faces an outer peripheral surface of the corresponding developing roller 60. Further, as a result of the attachment of the drum cartridge 3 to which the toner cartridges 2 are attached to the body frame 4, the developing rollers 60 become rotatable by driving force supplied from a main body of the image-forming apparatus 1. In accordance with the movement of the shutter 16 from the closed position to the open position, the toner discharge opening 15 is opened so that the toner in each toner cartridge 2 is supplied to the outer peripheral surface of the corresponding developing roller 60.

Each photosensitive drum 70 is rotatable abut a rotation axis (drum axis) extending in the first direction. The photosensitive drum 70 has one end portion in the first direction supported by the first side frame 51, and another end portion in the first direction supported by the second side frame 52. The four photosensitive drums 70 are arrayed with one another in the second direction at intervals. The photosensitive drum 70 has an outer peripheral surface coated with a photosensitive material. A gap is provided between the outer peripheral surface of the developing roller 60 and the outer peripheral surface of the corresponding photosensitive drum 70.

As a result of the attachment of the drum cartridge 3 with the toner cartridges 2 attached thereto to the body frame 4, the photosensitive drums 70 become rotatable by driving force supplied from the main body of the image-forming apparatus 1. Further, in a printing process, light is irradiated onto the outer peripheral surface of each photosensitive drum 70 from a light source (not illustrated) positioned at the body frame 4, thereby exposing locally the outer peripheral surface of each photosensitive drum 70 to light. Thereafter, the toner carried on the outer peripheral surface of the corresponding developing roller 60 is supplied to the light-irradiated portion of the photosensitive drum 70. The toner is then transferred from each photosensitive drum 70 to the printing sheet to form a toner image on the printing sheet.

Figure 18:
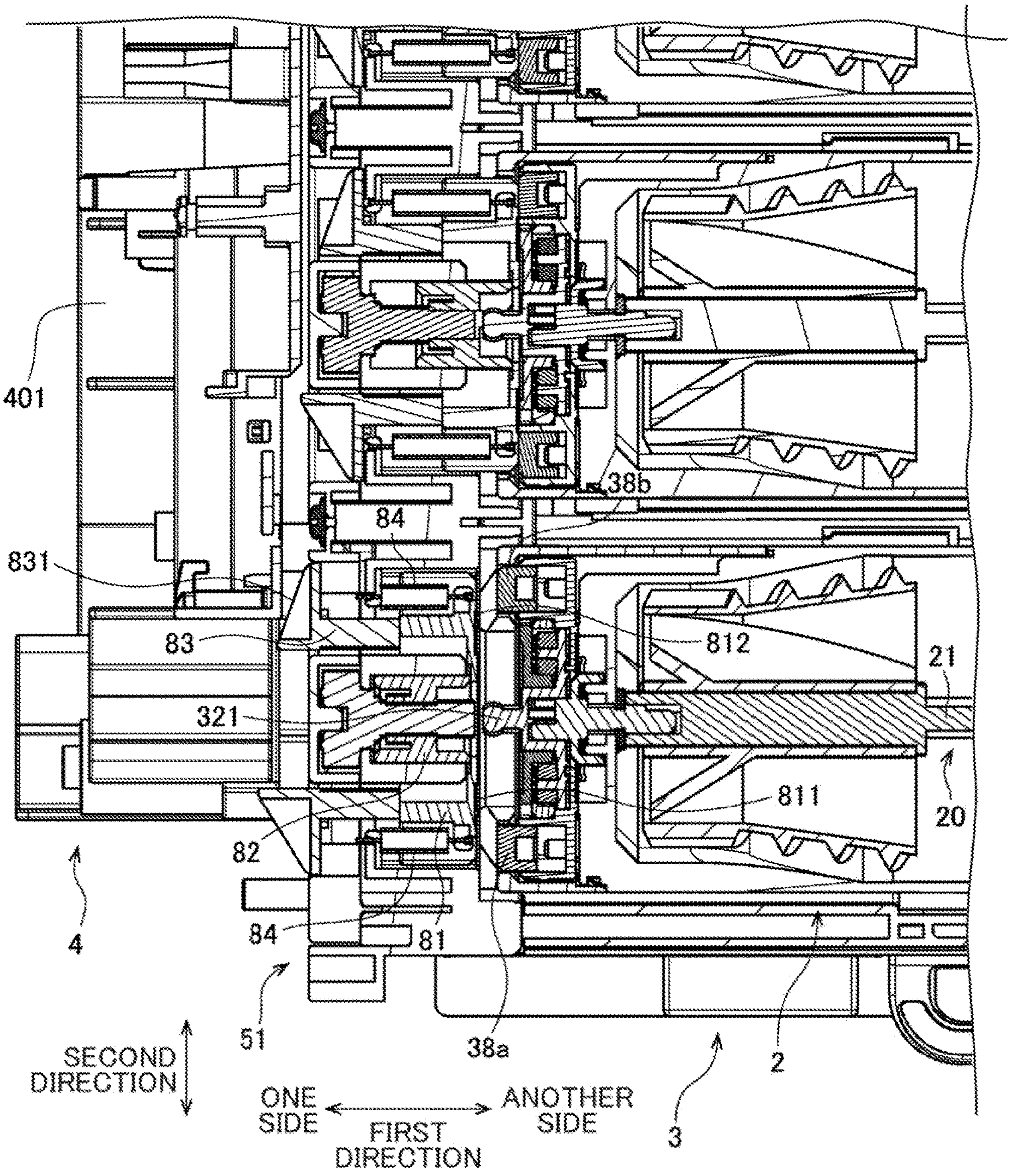
FIG. 18 is a partial cross-sectional view of the image-forming apparatus illustrating a state where the drum cartridge to which the toner cartridges according to the embodiment are attached is being inserted into the body frame of the image-forming apparatus.

FIG. 18 is a partial cross-sectional view of the image-forming apparatus 1 illustrating a state where the drum cartridge 3 to which the toner cartridges 2 are attached is being inserted into the body frame 4. As illustrated in FIG. 18, the unlock members 81, the relay couplings 82, the contact members 83, and the tension springs 84 are positioned at the first side frame 51.

Each unlock member 81 is configured to act on the two locking members 38*a*, 38*b* of the corresponding toner cartridge 2 to release the locking state of the shutter 16. The unlock member 81 is movable in the first direction between a retracted position and an advanced position. The advanced position of the unlock member 81 is closer to the second side frame 52 than the retracted position of the unlock member 81 is to the second side frame 52 in the first direction.

Each unlock member 81 includes a first pressing portion 811 and a second pressing portion 812. The first pressing portion 811 and the second pressing portion 812 protrude toward the second side frame 52. In a state where the unlock member 81 is at the advanced position while the toner cartridge 2 is attached to the drum cartridge 3, the first pressing portion 811 presses against the locking protrusion 381*a* of the toner cartridge 2, and the second pressing portion 812 presses against the locking protrusion 381*b* of the toner cartridge 2.

The relay coupling 82 is configured to supply the driving force to the toner coupling 321 of the corresponding toner cartridge 2. The relay coupling 82 is rotatable about a rotation axis (coupling axis) extending in the first direction. Further, the relay coupling 82 is movable in the first direction, together with the corresponding unlock member 81, between a retracted position and an advanced position. The advanced position of the relay coupling 82 is closer to the second side frame 52 than the retracted position of the relay coupling 82 is to the second side frame 52 in the first direction. The relay coupling 82 is connectable to the toner coupling 321 in a state where the relay coupling 82 is at the advanced position while the toner cartridge 2 is attached to the drum cartridge 3.

The contact member 83 is configured to contact the first side plate 401 of the body frame 4 upon attachment of the drum cartridge 3 to the body frame 4. The contact member 83 is movable in the first direction, together with the corresponding unlock member 81 and relay coupling 82, between a retracted position and an advanced position. The advanced position of the contact member 83 is closer to the second side frame 52 than the retracted position of the contact member 83 is to the second side frame 52 in the first direction. Each contact member 83 has a sloped surface 831 which is inclined with respect to the second direction.

The tension springs 84 urge the corresponding unlock member 81, relay coupling 82, and contact member 83 toward the respective retracted positions in the first direction. Each tension spring 84 has one end in the first direction connected to the first side frame 51, and another end in the first direction connected to the corresponding unlock member 81. A length in the first direction of the tension spring 84 is changeable between a stretched state and a shrinking state. The length in the first direction of the tension spring 84 in the stretched state is greater than that in the shrinking state. Further, the length in the first direction of the tension spring 84 in the stretched state is greater than a natural length of the tension spring 84. The unlock member 81, the relay coupling 82, and the contact member 83 are normally urged toward the respective retracted positions from the advanced position because of the shrinking nature of the tension spring 84.

The tension spring 84 is in the shrinking state in a state where the drum cartridge 3 is not attached to the body frame 4. Therefore, the unlock member 81, the relay coupling 82, and the contact member 83 are at the retracted positions. In this case, the unlock member 81 is positioned away from the locking members 38*a*, 38*b* of the corresponding toner cartridge 2 in the first direction. Specifically, the first pressing portion 811 is spaced away from the locking member 38*a* of the toner cartridge 2 in the first direction, and the second pressing portion 812 is spaced away from the locking member 38*b* of the toner cartridge 2 in the first direction. Each of the locking members 38*a*, 38*b* of the toner cartridge 2 is thus at the locking position. Further, at this time, the relay coupling 82 is positioned away from the toner coupling 321. Thus, no driving force is supplied to the toner coupling 321.

Upon attachment, to the body frame 4, of the drum cartridge 3 to which the toner cartridge 2 are attached, a part of the contact member 83 contacts an inner surface of the body frame 4. Specifically, the sloped surface 831 of the contact member 83 contacts the first side plate 401 of the body frame 4. As a result, the contact member 83 moves from the retracted position to the advanced position against the urging force of the tension springs 84, and accordingly, the unlock member 81 is also moved to the advanced position together with the contact member 83. Hence, the first pressing portion 811 of the unlock member 81 presses the locking protrusion 381*a* in the first direction, and the second pressing portion 812 of the unlock member 81 presses the locking protrusion 381*b* in the first direction. Consequently, the locking protrusions 381*a*, 381*b* move from the locking position to the release position, thereby allowing the shutter 16 to be unlocked.

Further, the relay coupling 82 is also moved together with the contact member 83 from the retracted position to the advanced position in the first direction. Hence, the relay coupling 82 becomes connected to the toner coupling 321. The toner coupling 321 is thus allowed to rotate in accordance with the rotation of the relay coupling 82 by the driving force from the main body of the image-forming apparatus 1.

As described above, the unlock member 81 for pressing the locking members 38*a*, 38*b* of the toner cartridge 2 is not provided in the body frame 4 of the image-forming apparatus 1, but is provided in the drum cartridge 3. Therefore, more precise positioning of the unlock member 81 relative to the locking members 38*a*, 38*b* is attainable than in a comparative configuration where the unlock member 81 is provided in the body frame 4. Accordingly, the unlock member 81 can accurately presses against the locking members 38*a*, 38*b* of the corresponding toner cartridge 2.

Further, in accordance with the attaching operation of the drum cartridge 3 to the body frame 4, the unlock member 81 moves from the retracted position to the advanced position. That is, the unlock member 81 can be moved from the retracted position to the advanced position, independent of driving force of a motor in the image-forming apparatus 1.

Further, the unlock member 81 is positioned at the retracted position when the drum cartridge 3 is not attached to the body frame 4. Therefore, the unlock member 81 does not impede attachment of the toner cartridges 2 to the drum cartridge 3.

Further, the relay coupling 82 for supplying the driving force to the toner coupling 321 of the toner cartridge 2 is not provided in the body frame 4 of the image-forming apparatus 1, but is provided in the drum cartridge 3. Therefore, precise positioning of the relay coupling 82 relative to the toner coupling 321 is attainable when compared to a case where the relay coupling 82 is provided in the body frame 4. Accordingly, reliable connection of the relay coupling 82 to the toner coupling 321 can be attained.

Figure 19:
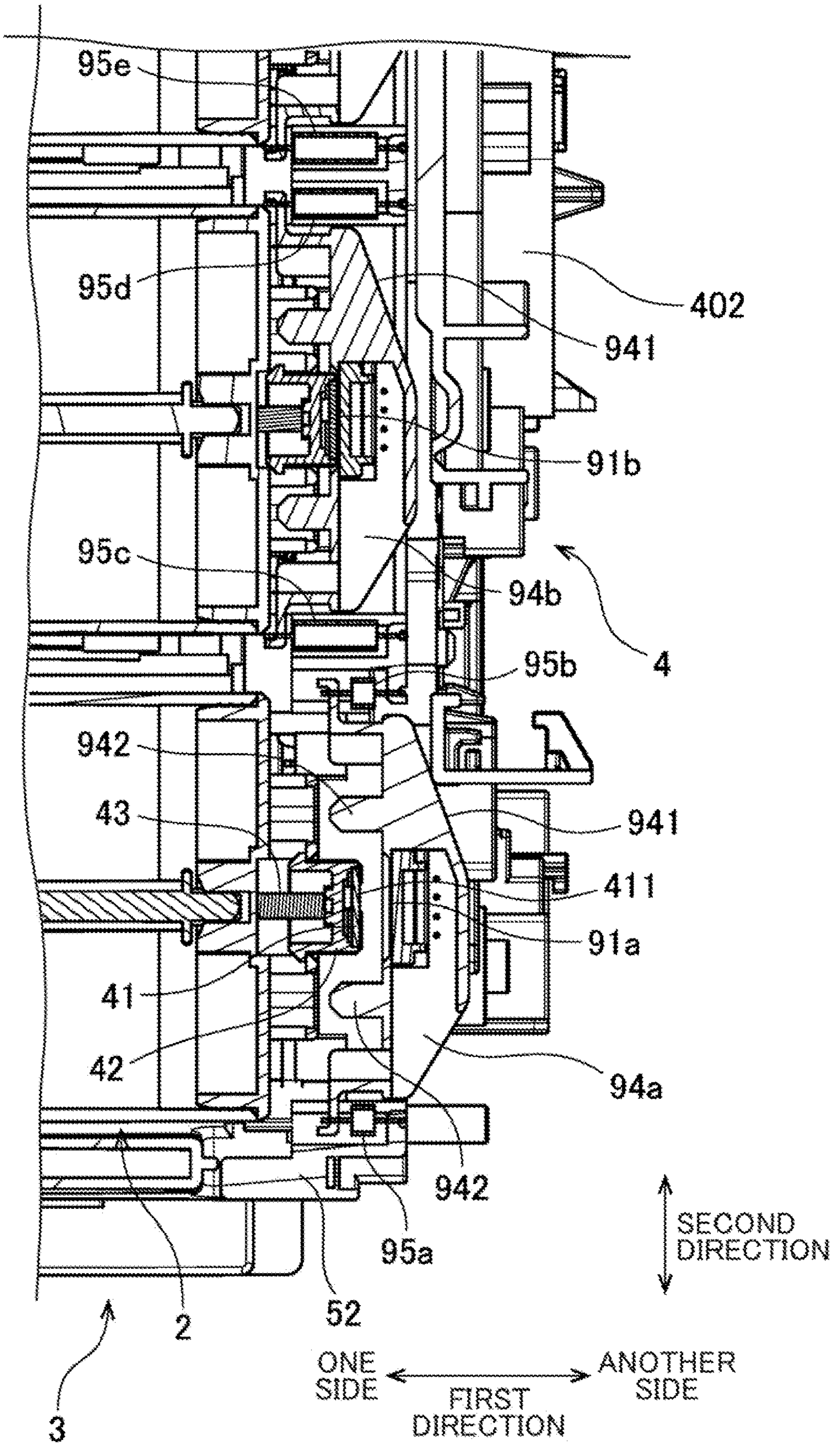
FIG. 19 is another partial cross-sectional view of the image-forming apparatus illustrating a state where the drum cartridge to which the toner cartridge according to the embodiment are attached is being inserted into the body frame.

The wiring portion 90 is configured to electrically connect the IC chip 41 of each toner cartridge 2 to the built-in connector 403 of the image-forming apparatus 1. FIG. 19 is a partial cross-sectional view of the image-forming apparatus 1 illustrating a state where the drum cartridge 3 to which the toner cartridges 2 are attached is being inserted into the body frame 4.

As illustrated in FIGS. 1 and 19, the wiring portion 90 includes the four drum contacts 91*a*, 91*b*, 91*c*, 91*d*, the drum harness 92, the drum connector 93, four contact holders 94*a*, 94*b*, 94*c*, 94*d* (the contact holders 94*c* and 94*d* are illustrated in FIGS. 16 and 17), and eight contact springs 95*a* through 95*h* (the contact springs 95*f* through 95*h* are not illustrated).

Each of the four drum contacts 91*a*, 91*b*, 91*c*, 91*d* is electrically connected to the drum connector 93 through the drum harness 92. The drum connector 93 is positioned at the third frame 53. The drum connector 93 makes contact with the built-in connector 403 of the body frame 4 upon attachment, to the body frame 4, of the drum cartridge 3 to which the toner cartridges 2 are attached. The drum connector 93 and the built-in connector 403 are thus electrically connected to each other.

The four drum contacts 91*a*-91*d* are positioned at the second side frame 52. The four drum contacts 91*a*-91*d* are arrayed with one another in the second direction at intervals. The four contact holders 94*a*-94*d* are positioned at the second side frame 52. The four contact holders 94*a*-94*d* are arrayed with one another in the second direction at intervals.

Specifically, the drum contact 91*a* is supported by the contact holder 94*a*. The drum contact 91*a* is positioned on a surface of the contact holder 94*a*, the surface facing the first side frame 51. The drum contact 91*b* is supported by the contact holder 94*b*. The drum contact 91*b* is positioned on a surface of the contact holder 94*b*, the surface facing the first side frame 51. The drum contact 91*c* is supported by the contact holder 94*c*. The drum contact 91*c* is positioned on a surface of the contact holder 94*c*, the surface facing the first side frame 51. The drum contact 91*d* is supported by the contact holder 94*d*. The drum contact 91*d* is positioned on a surface of the contact holder 94*d*, the surface facing the first side frame 51.

The contact holder 94*a* has an inclined surface 941. The inclined surface 941 is inclined with respect to the second direction. The inclined surface 941 contacts the second side plate 402 of the body frame 4 upon attachment of the drum cartridge 3 to the body frame 4. The contact holder 94*a* has two protrusions 942. The protrusions 942 protrude in the first direction toward the first side frame 51 from the facing surface of the contact holder 94*a*. Likewise, each of the contact holders 94*b*-94*d* has the inclined surface 941 and the two protrusions 942.

The drum contacts 91*a*-91*d* and the contact holders 94*a*-94*d* are movable in the first direction between a separated position and a contacting position. The contacting position of the drum contacts 91*a*-91*d* is closer to the first side frame 51 than the separated position is to the first side frame 51 in the first direction. Further, the contacting position of the contact holders 94*a*-94*d* is closer to the first side frame 51 than the separated position of the contact holders 94*a*-94*d* is to the first side frame 51 in the first direction.

The two contact springs 95*a*, 95*b* are urging members (tension springs) configured to urge the drum contact 91*a* and the contact holder 94*a* in the direction from the contacting position toward the separated position. The two contact springs 95*c*, 95*d* are urging members (tension springs) configured to urge the drum contact 91*b* and the contact holder 94*b* in the direction from the contacting position to the separated position. The two contact springs 95*e*, 95*f* are urging members (tension springs) configured to urge the drum contact 91*c* and the contact holder 94*c* in the direction from the contacting position to the separated position. The two contact springs 95*g*, 95*h* are urging members (tension springs) configured to urge the drum contact 91*d* and the contact holder 94*d* in the direction from the contacting position to the separated position.

Each of the contact springs 95*a*, 95*b* has one end in the first direction connected to the contact holder 94*a*, and another end connected to the second side frame 52. Each of the contact springs 95*c*, 95*d* has one end in the first direction connected to the contact holder 94*b*, and another end connected to the second side frame 52. Each of the contact springs 95*e*, 95*f* has one end in the first direction connected to the contact holder 94*c*, and another end connected to the second side frame 52. Each of the contact springs 95*g*, 95*h* has one end in the first direction connected to the contact holder 94*d*, and another end connected to the second side frame 52.

A length in the first direction of each of the contact springs 95*a*-95*h* is changeable between a stretched state and a shrinking state. The length in the first direction of the contact springs 95*a*-95*h* in the stretched state is greater than that in the shrinking state. Further, the length in the first direction of the contact springs 95*a*-95*h* in the stretched state is greater than the natural length of the contact springs 95*a*-95*h*.

The drum contact 91*a* and the contact holder 94*a* are normally urged toward the separated position from the contacting position because of shrinking nature of the contact springs 95*a*, 95*b*. Likewise, the drum contact 91*b* and the contact holder 94*b* are normally urged toward the separated position from the contacting position because of shrinking nature of the contact springs 95*c*, 95*d*. The drum contact 91*c* and the contact holder 94*c* are normally urged toward the separated position from the contacting position because of shrinking nature of the contact springs 95*e*, 95*f* The drum contact 91*d* and the contact holder 94*d* are normally urged toward the separated position from the contacting position because of shrinking nature of the contact springs 95*g*, 95*h*.

The contact springs 95*a*-95*h* are in the shrinking state in a state where the drum cartridge 3 is not attached to the body frame 4. Therefore, the drum contacts 91*a*-91*d* and the contact holders 94*a*-94*d* are at the separated position. In this case, the drum contacts 91*a*-91*d* are positioned apart from the electrical contact surfaces 411 of the IC chips 41 of the respective toner cartridges 2 in the first direction.

In accordance with the attachment, to the body frame 4, of the drum cartridge 3 to which the toner cartridges 2 are attached, a part of each of the contact holders 94*a*-94*d* contacts an inner surface of the body frame 4. Specifically, the inclined surface 941 of each of the contact holders 94*a*-94*d* is brought into abutment with the second side plate 402. Therefore, the contact holders 94*a*-94*d* move from the separated position to the contacting position against the urging force of the contact springs 95*a*-95*h*. Hence, the drum contacts 91*a*-91*d* are also moved from the separated position to the contacting position by the movement of the contact holders 94*a*-94*d*.

Accordingly, the drum contacts 91*a*-91*d* are brought into contact with the electrical contact surfaces 411 of the IC chips 41 of the respective toner cartridges 2. Consequently, information stored in each IC chip 41 can be transmitted to the controller 5 through the drum contacts 91*a*-91*d*, the drum harness 92, the drum connector 93, the built-in connector 403, and the built-in harness 404.

As illustrated in FIGS. 4 and 6, the toner cartridge 2 has two recessed portions 121 positioned at the second end portion 12 of the casing 10. Each of the recessed portions 121 is recessed in the first direction toward the first end portion 11 of the casing 10. In accordance with the movement of the contact holders 94*a*-94*d* from the separated position to the contacting position, the protrusions 942 of each of the contact holders 94*a*-94*d* are inserted into the recessed portions 121 (FIGS. 4 and 6) of the corresponding toner cartridges 2. This engagement with the recessed portions 121 can provide accurate positioning of the contact holders 94*a*-94*d* relative to the respective toner cartridges 2. As a result, accurate electrical connection of the drum contacts 91*a*-91*d* to the electrical contact surfaces 411 of the IC chips 41 of the respective toner cartridges 2 can be attained.

As described above, in accordance with the attaching operation of the drum cartridge 3 to the body frame 4, the drum contacts 91*a*-91*d* move in the first direction from the separated position to the contacting position. Therefore, the movement of the drum contacts 91*a*-91*d* from the separated position to the contacting position can be performed without relying on the driving force of the motor positioned in the main body of the image-forming apparatus 1. Further, frictional wearing between the electrical contact surfaces 411 of the IC chips 41 and the drum contacts 91*a*-91*d* can be restrained at the time of the attachment of the toner cartridges 2 to the drum cartridge 3.

Further, the drum contacts 91*a*-91*d* and the contact holders 94*a*-94*d* are at the separated position before attachment of the drum cartridge 3 to the body frame 4. With this structure, the drum contacts 91*a*-91*d* and the contact holders 94*a*-94*d* do not prevent the attachment of the toner cartridges 2 to the drum frame 50.

4. Modifications

While the description has been made in detail with reference to the embodiment, it would be apparent to those skilled in the art that many modifications and variations may be made thereto. In the following description, structures of the respective modifications different from the structure of the above-described embodiment will particularly be described.

4-1. First Modification

Figure 20:
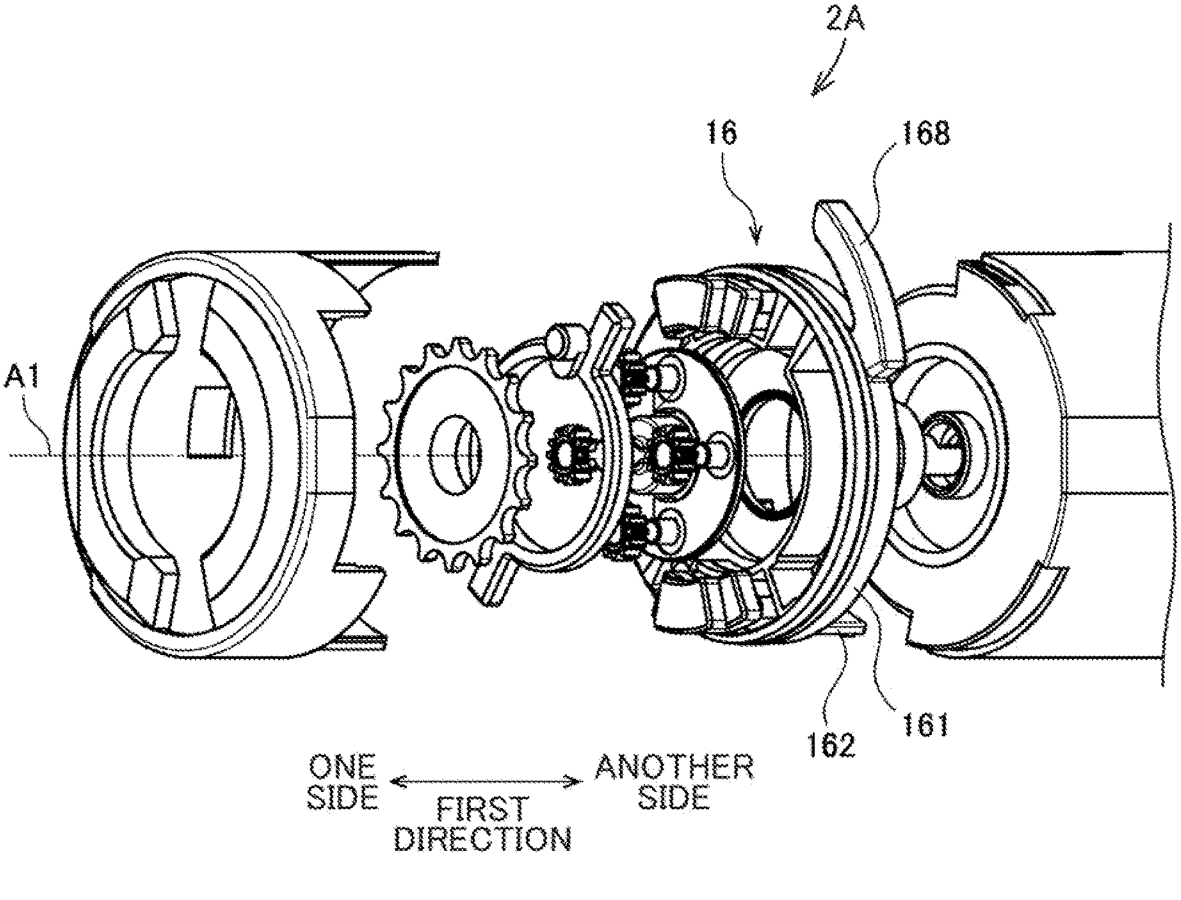
FIG. 20 is a partial exploded perspective view of a toner cartridge according to a first modification.

FIG. 20 is a partial exploded perspective view of a toner cartridge 2A according to a first modification. The toner cartridge 2A according to the first modification is different from the toner cartridge 2 of the above-described embodiment in that: the toner cartridge 2A does not include the return springs 31*a*, 31*b*; and the shutter 16 further has a lever 168. The lever 168 extends outward from an outer peripheral surface of the holder 161. The lever 168 is positioned opposite to the shutter plate 162 with respect to the first axis A1.

Figure 21:
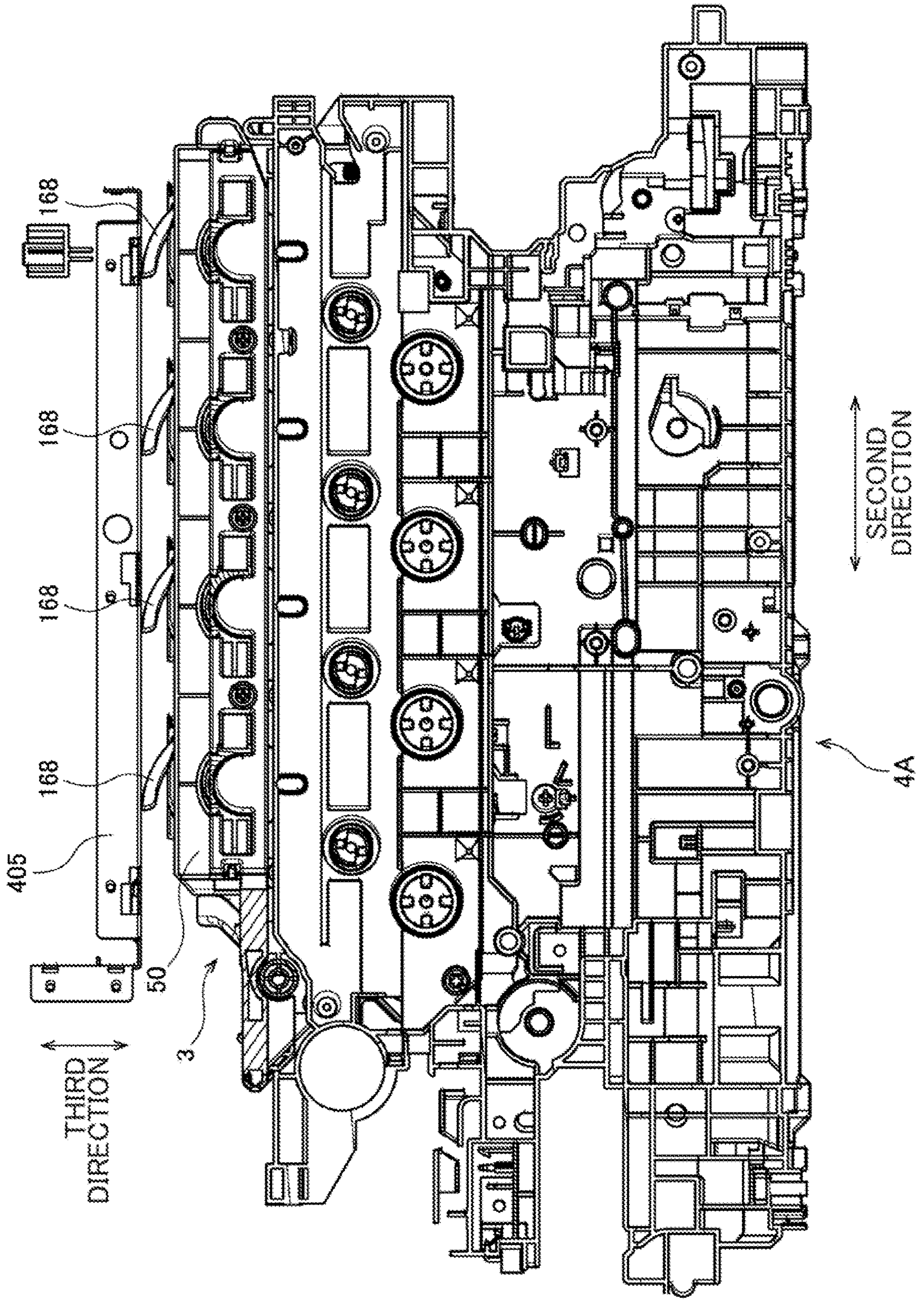
FIG. 21 is a view illustrating a state where the drum cartridge to which the toner cartridges according to the first modification are attached is attached to a modified body frame of an image-forming apparatus in the first modification.

FIG. 21 is a view for description of attachment of the drum cartridge 3 (to which the toner cartridges 2A according to the first modification are attached) to a body frame 4A of an image-forming apparatus. As illustrated in FIG. 21, the body frame 4A includes a third plate 405. The third plate 405 is positioned between the first side plate 401 and the second side plate 402 in the first direction. Further, the third plate 405 faces the levers 168 of the toner cartridges 2A in the third direction in a state where the drum cartridge 3 having the toner cartridges 2A attached thereto is attached to the body frame 4A.

Figure 22:
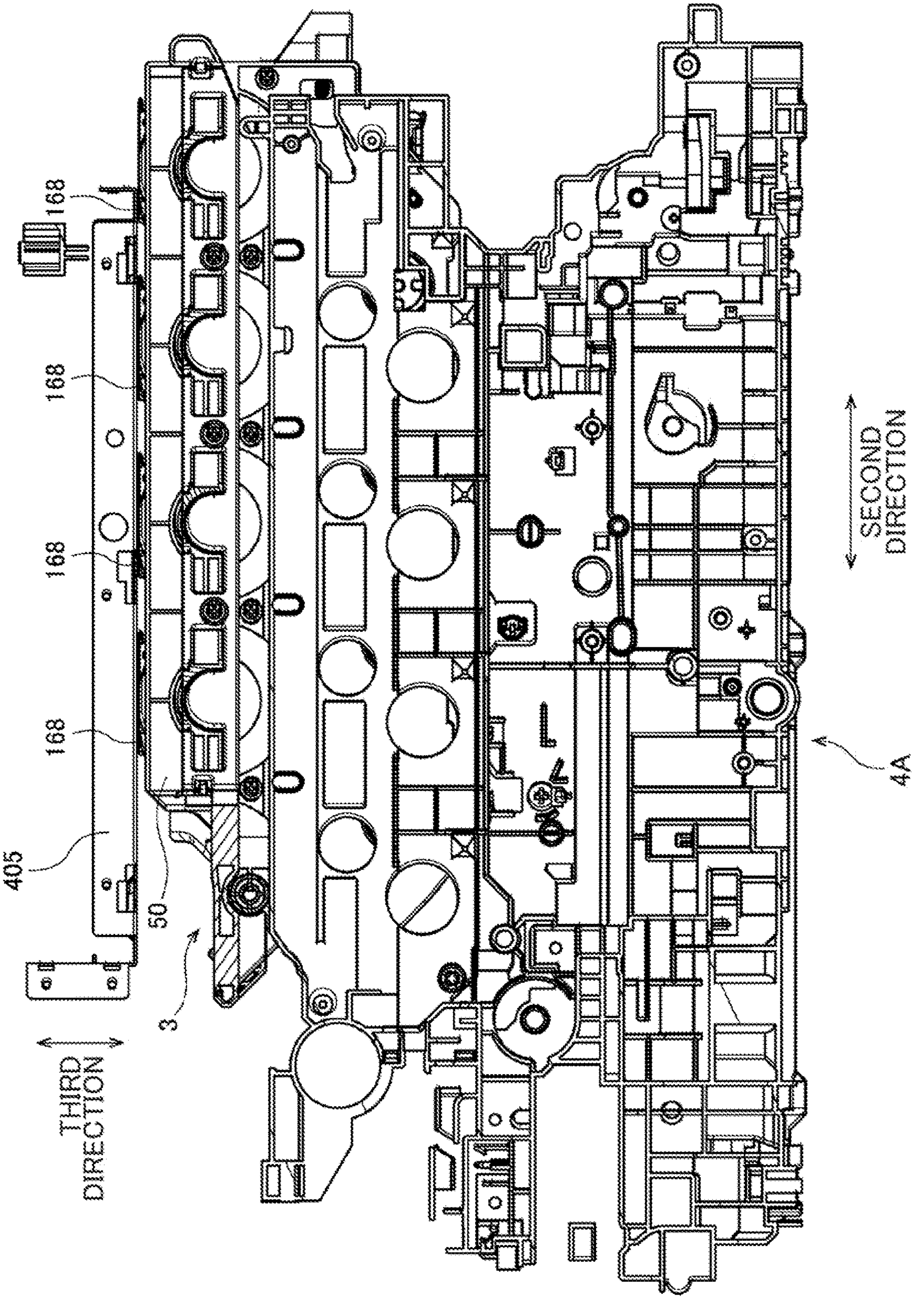
FIG. 22 is a view illustrating a state where the drum cartridge to which the toner cartridges according to the first modification are attached is to be detached from the modified body frame of the image-forming apparatus in the first modification.

FIG. 22 is a view for description of detachment of the drum cartridge 3 (to which the toner cartridges 2A according to the first modification are attached) from the body frame 4A. As illustrated in FIG. 22, the drum cartridge 3 moves in the third direction toward the third plate 405. At this time, the shutters 16 move from the open position to the closed position by the abutment of the levers 168 on the third plate 405. As a result, each toner discharge opening 15 is closed by the shutter plate 162 in each of the toner cartridges 2A. The drum cartridge 3 can be pulled out in the second direction, thereafter.

With this arrangement of the first modification, the shutter 16 can be moved from the open position to the closed position in accordance with the pulling-out operation of the drum cartridge 3 from the body frame 4A without the return springs 31*a*, 31 *b*. Hence, the number of components in each toner cartridge 2A can be reduced.

4-2. Second Modification

In the depicted embodiment, the shutter 16 moves from the open position to the closed position by utilizing the shrinking force of the return springs 31*a*, 31 *b* (tension springs) generated by the change in length of the return spring 31*a*, 31*b* from the second state (providing the longer length than the natural length) to the first state. However, compression springs may be used, instead of the tension springs, so that the shutter 16 can be moved from the open position to the closed position by the expanding force of the compression springs generated by a change in length of the return springs 31*a*, 31 *b* from a third state providing a smaller length than the natural length to a fourth state providing a length to restore the natural length.

4-3. Third Modification

In the depicted embodiment, the toner cartridge 2 includes the four planetary gears 33*a*-33*d*. However, the number of planetary gears need not be four, but may be from one to three or may be not less than five.

4-4. Fourth Modification

In the above-described embodiment, four of the toner cartridges 2 are attachable to the single drum cartridge 3. However, from one to three toner cartridges 2 or not less than five toner cartridges 2 may be attachable to the single drum cartridge 3. In accordance with the number of attachable toner cartridges 2 to the drum cartridge 3, the drum cartridge 3 may include from one to three developing rollers 60 or not less than five developing rollers 60. Similarly, the drum cartridge 3 may include from one to three photosensitive drums 70 or not less than five photosensitive drums 70. Likewise, the drum cartridge 3 may include from one to three relay couplings 82 or not less than five relay couplings 82. The drum cartridge 3 may include from one to three drum contacts 91 or not less than five drum contacts 91.

4-5. Fifth Modification

The toner coupling and the relay coupling may be provided as gears.

4-6. Sixth Modification

The sun gear, the planetary gears, and the ring gear may not have gear teeth, but may have frictional power transmission members made from rubber, for example, instead of the gear teeth.

4-7. Seventh Modification

The toner cartridge 2 according to the depicted embodiment includes the agitator 20 as the conveyer member. However, an auger having a helical shape is also available as the conveyer member.

4-8. Other Modifications

Shapes of the components constituting the toner cartridge and the image-forming apparatus need not be limited to those illustrated in the drawings. Further, these components appearing in the embodiment and the above modifications may be suitably replaced by one another, as long as no technological conflicts and contradictions are incurred.

REMARKS

The toner cartridge 2, 2A is an example of a toner cartridge. The casing 10 is an example of a casing. The agitator 20 is an example of a conveyer member. The shutter 16 is an example of a shutter. The toner coupling 321 is an example of a toner coupling. The planet carrier 322 is an example of a planet carrier. The first planetary gear 33*a* is an example of a first planetary gear. The ring gear 34 is an example of a ring gear. The sun gear 351 is an example of a sun gear. The rotary plate 352 is an example of a rotary plate. The boss 37*a*, 37*b* is an example of a boss. The first stopper surface 18 is an example of a first stopper. The second stopper surface 17 is an example of a second stopper. The cover 36 is an example of a cover. The guide groove 367*a*, 367*b* is an example of a guide groove. The communication opening 363 is an example of a communication opening. The return spring 31*a*, 31 *b* is an example of a shutter elastic member. The clutch hole 324*a*, 324*b* is an example of a clutch hole. The clutch pawl 211*a*, 211*b* is an example of a clutch pawl. The locking member 38*a*, 38*b* is an example of a locking member. The locking protrusion 381*a*, 381*b* is an example of a locking protrusion. The locking spring 382*a*, 382*b* is an example of a locking elastic member.

What is claimed is:

1. A toner cartridge comprising:

a casing configured to accommodate therein toner, the casing having a toner discharge opening;

a conveyer member positioned inside the casing and rotatable about a first axis extending in a first direction, the conveyer member comprising a shaft extending in the first direction;

a shutter rotatable relative to the casing about the first axis between a closed position where the shutter closes the toner discharge opening and an open position where the shutter opens the toner discharge opening;

a toner coupling rotatable about the first axis and configured to rotate the conveyer member;

a planet carrier rotatable about the first axis with the toner coupling, the planet carrier including a first planet pin extending in the first direction;

a first planetary gear rotatable about the first planet pin relative to the planet carrier, the first planetary gear being rotatable about the first axis in accordance with the rotation of the planet carrier about the first axis; and a ring gear rotatable about the first axis with the shutter, the ring gear meshing with the first planetary gear, wherein the first planetary gear is not rotatable about the first planet pin and is rotatable about the first axis with the ring gear when the shutter moves from the closed position to the open position, and wherein the first planetary gear is rotatable about the first planet pin and is rotatable relative to the ring gear about the first axis in a state where the shutter is at the open position.

2. The toner cartridge according to claim 1, further comprising a first stopper configured to contact the shutter to prevent movement of the shutter to the open position from the closed position in a first rotational direction in the state where the shutter is the open position.

3. The toner cartridge according to claim 2, further comprising a second stopper configured to contact the shutter to prevent movement of the shutter to the closed position from the open position in a second rotational direction opposite the first rotational direction in a state where the shutter is at the closed position.

4. The toner cartridge according to claim 3, wherein the casing has a recess at a peripheral surface of the casing, wherein the shutter is positioned at the recess, wherein the recess has a first surface having the toner discharge opening and a second stopper surface extending from the first surface in a radial direction of the shaft, and wherein the second stopper surface is the second stopper.

5. The toner cartridge according to claim 2, wherein the casing has a recess at a peripheral surface of the casing, wherein the shutter is positioned at the recess, wherein the recess has a first surface having the toner discharge opening, and a first stopper surface extending from the first surface in a radial direction of the shaft, and wherein the first stopper surface is the first stopper.

6. The toner cartridge according to claim 1, wherein the first planetary gear does not rotate about the first planet pin and is rotatable in accordance with the rotation of the ring gear about the first axis in a state where the shutter is at the closed position.

7. The toner cartridge according to claim 1, further comprising a sun gear rotatable about the first axis and meshing with the first planetary gear.

8. The toner cartridge according to claim 7, further comprising:

a rotary plate rotatable about the first axis with the sun gear, the rotary plate having a groove; and a boss movable in accordance with the rotation of the shutter, the boss being movable between a first position where the boss is positioned in the groove and a second position where the boss is positioned outside the groove, wherein the boss is at the first position in a state where the shutter is at the closed position, and the boss is at the second position in the state where the shutter is at the open position.

9. The toner cartridge according to claim 8, wherein, in a state where the boss is at the first position, in accordance with the rotation of the toner coupling, the sun gear and the rotary plate are rotatable about the first axis, the first planetary gear is not rotatable about the first planet pin and is rotatable around the sun gear, and the ring gear is movable with the shutter relative to the casing, and wherein, in a state where the boss is at the second position, in accordance with the rotation of the toner coupling, the sun gear and the rotary plate are rotatable about the first axis, the first planetary gear is rotatable about the first planet pin and is rotatable around the sun gear, and the ring gear and the shutter are immovable relative to the casing.

10. The toner cartridge according to claim 8, further comprising a cover covering at least a part of the shutter, wherein the cover has a guide groove in which the boss is inserted, the guide groove extending in a moving direction of the shutter, the guide groove having one end and another end in the moving direction, the one end being positioned closer to the first axis than the another end is to the first axis.

11. The toner cartridge according to claim 10, wherein the boss is at the one end of the guide groove in a state where the boss is at the first position, and wherein the boss is at the another end of the guide groove in a state where the boss is at the second position.

12. The toner cartridge according to claim 10, wherein the cover covers at least a part of the boss.

13. The toner cartridge according to claim 8, wherein the sun gear is integral with the rotary plate.

14. The toner cartridge according to claim 8, wherein the rotary plate has a plurality of the grooves.

15. The toner cartridge according to claim 14, wherein the plurality of the grooves is on an entire outer peripheral surface of the rotary plate.

16. The toner cartridge according to claim 7, wherein the sun gear is positioned at one end portion in the first direction of the casing.

17. The toner cartridge according to claim 7, wherein the sun gear has a circular hole centered on the first axis, and wherein the toner coupling is inserted in the circular hole.

18. The toner cartridge according to claim 7, wherein the toner coupling, the sun gear, the first planetary gear, and the ring gear are positioned at a plane extending perpendicularly to the first axis.

19. The toner cartridge according to claim 1, wherein the toner cartridge is attachable to and detachable from a drum cartridge including a photosensitive drum and a relay coupling, and wherein the toner coupling is configured to receive a driving force from the relay coupling to transmit the driving force to the conveyer member in a state where the toner cartridge is attached to the drum cartridge.

20. The toner cartridge according to claim 1, wherein the planet carrier is integral with the toner coupling.

21. The toner cartridge according to claim 1, further comprising a cover covering at least a part of the shutter.

22. The toner cartridge according to claim 21, wherein the cover has a communication opening in communication with the toner discharge opening.

23. The toner cartridge according to claim 21, further comprising a locking member movable in the first direction between a locking position and a release position, wherein the shutter is immovable from the closed position to the open position when the locking member is at the locking position, and the shutter is movable from the closed position to the open position when the locking member is at the release position.

24. The toner cartridge according to claim 23, wherein the locking member comprises: a locking protrusion configured to contact the cover when the locking member is at the locking position and to be separated from the cover when the locking member is at the release position; and a locking elastic member urging the locking protrusion toward the locking position from the release position.

25. The toner cartridge according to claim 24, wherein the cover has a through-hole extending throughout a thickness of the cover in the first direction, and wherein the locking protrusion is configured to be inserted in the through-hole.

26. The toner cartridge according to claim 24, wherein the locking elastic member is a spring.

27. The toner cartridge according to claim 1, wherein the ring gear comprises: gear teeth meshing with the first planetary gear; and an arm extending in a direction away from the first planetary gear with respect to the gear teeth, and wherein the shutter comprises: a shutter plate configured to cover the toner discharge opening; and a holder holding the ring gear and having a recess in which the arm is inserted.

28. The toner cartridge according to claim 1, further comprising a shutter elastic member configured to urge the shutter from the open position toward the closed position.

29. The toner cartridge according to claim 28, wherein the shutter elastic member is configured to be compressed and stretched between a first state where the shutter is at the closed position and a second state where the shutter is at the open position, the shutter elastic member having a length greater in the second state than in the first state.

30. The toner cartridge according to claim 29, wherein the shutter elastic member is stretched from the first state to the second state in response to the rotation of the shutter from the closed position to the open position.

31. The toner cartridge according to claim 29, wherein the shutter elastic member is compressed from the second state to the first state in response to a halt in rotation of the toner coupling, and wherein the shutter moves from the open position to the closed position when the shutter elastic member is compressed from the second state to the first state.

32. The toner cartridge according to claim 28, wherein the shutter elastic member is a spring.

33. The toner cartridge according to claim 1, wherein the toner coupling is positioned at one end portion in the first direction of the casing.

34. The toner cartridge according to claim 1, wherein the first planetary gear is positioned at one end portion in the first direction of the casing.

35. The toner cartridge according to claim 1, wherein the ring gear is positioned at one end portion in the first direction of the casing.

36. The toner cartridge according to claim 1, wherein the planet carrier has a second planet pin extending in the first direction, the toner cartridge further comprising a second planetary gear rotatable about the second planet pin relative to the planet carrier, the second planetary gear being rotatable about the first axis with the planet carrier.

37. The toner cartridge according to claim 36, wherein the planet carrier has a third planet pin extending in the first direction, the toner cartridge further comprising a third planetary gear rotatable about the third planet pin relative to the planet carrier, the third planetary gear being rotatable about the first axis with the planet carrier.

38. The toner cartridge according to claim 37, wherein the planet carrier has a fourth planet pin extending in the first direction, the toner cartridge further comprising a fourth planetary gear rotatable about the fourth planet pin relative to the planet carrier, the fourth planetary gear being rotatable about the first axis with the planet carrier.

39. The toner cartridge according to claim 1, further comprising a clutch configured to prevent the conveyer member from rotating with the toner coupling in response to the movement of the shutter from the open position to the closed position.

40. The toner cartridge according to claim 39, wherein the toner coupling has a clutch hole having an arcuate shape centered on the first axis, the clutch hole having a length in a circumferential direction of the toner coupling about the first axis, wherein the conveyer member has a clutch pawl inserted in the clutch hole, the length of the clutch hole in the circumferential direction about the first axis being greater than a length of the clutch pawl in the circumferential direction about the first axis, and wherein a combination of the clutch hole and the clutch pawl constitute the clutch.

41. The toner cartridge according to claim 1, wherein the toner discharge opening is positioned at one end portion in the first direction of the casing, and wherein the shutter is positioned at the one end portion in the first direction of the casing.

42. The toner cartridge according to claim 1, wherein the shutter is configured to open the toner discharge opening by moving in a circumferential direction of the casing about the first axis.

43. The toner cartridge according to claim 1, wherein the toner cartridge is attachable to and detachable from a body frame of an image-forming apparatus, and wherein the shutter includes a lever contactable with the body frame, the shutter being configured to move from the open position to the closed position by contact of the lever with the body frame.

44. The toner cartridge according to claim 1, wherein the conveyer member is an agitator.

* * * * *